United States Patent
Lee et al.

(10) Patent No.: US 12,244,747 B2
(45) Date of Patent: Mar. 4, 2025

(54) COVER AND ELECTRONIC DEVICE

(71) Applicant: Huawei Technologies Co., Ltd., Shenzhen (CN)

(72) Inventors: Chien-Ming Lee, Shenzhen (CN); Bin Yu, Shanghai (CN); Hanyang Wang, Reading (GB); Yuchan Yang, Shanghai (CN); Qiuchun Sheng, Shanghai (CN); Lizhong Huang, Dongguan (CN); Wenjun Chen, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 17/756,271

(22) PCT Filed: Nov. 4, 2020

(86) PCT No.: PCT/CN2020/126464
§ 371 (c)(1),
(2) Date: May 20, 2022

(87) PCT Pub. No.: WO2021/098511
PCT Pub. Date: May 27, 2021

(65) Prior Publication Data
US 2022/0417350 A1    Dec. 29, 2022

(30) Foreign Application Priority Data
Nov. 20, 2019   (CN) .......................... 201911143874.1

(51) Int. Cl.
H04M 1/02     (2006.01)
H01Q 1/22     (2006.01)
(Continued)

(52) U.S. Cl.
CPC .......... *H04M 1/026* (2013.01); *H01Q 1/2266* (2013.01); *H01Q 1/243* (2013.01); *H01Q 1/425* (2013.01); *H04M 1/0283* (2013.01)

(58) Field of Classification Search
None
See application file for complete search history.

(56) References Cited

U.S. PATENT DOCUMENTS 9,793,595 B1 *   10/2017  Padin ....................... H01Q 1/36
2012/0206303 A1   8/2012  Desclos et al.
(Continued)

FOREIGN PATENT DOCUMENTS

CN     201425967 Y     3/2010
CN     201667386 U     12/2010
(Continued)

*Primary Examiner* — Dameon E Levi
*Assistant Examiner* — Anh N Ho
(74) *Attorney, Agent, or Firm* — Slater Matsil, LLP

(57) ABSTRACT

A cover includes a cover body and a first line layer. The cover body is made of an insulating material, and the first line layer is made of a conductive material. The first line layer is completely built into the cover body, and the first line layer is configured to form a radiator, and is coupled to a radio frequency transceiver circuit of an electronic device. The first line layer includes a plurality of first conducting wires and a plurality of second conducting wires. The plurality of first conducting wires are arranged at intervals in a first direction, and the plurality of second conducting wires are arranged at intervals in a second direction. The plurality of first conducting wires and the plurality of second conducting wires are disposed intersecting each other. The first direction is different from the second direction.

15 Claims, 22 Drawing Sheets

(51) Int. Cl.
*H01Q 1/24* (2006.01)
*H01Q 1/42* (2006.01)

(56) References Cited

U.S. PATENT DOCUMENTS

| | | | |
|---|---|---|---|
| 2013/0207851 A1* | 8/2013 | Dabov | H01Q 7/00 343/702 |
| 2015/0255856 A1* | 9/2015 | Hong | H01Q 21/061 343/702 |
| 2016/0126614 A1* | 5/2016 | Lim | H01Q 1/44 343/720 |
| 2016/0344089 A1* | 11/2016 | Baik | H01Q 1/273 |
| 2018/0034130 A1 | 2/2018 | Jang | |
| 2018/0226840 A1 | 8/2018 | Leabman et al. | |
| 2019/0361549 A1* | 11/2019 | Gu | H01Q 1/24 |

FOREIGN PATENT DOCUMENTS

| | | | | |
|---|---|---|---|---|
| CN | 102569171 | A | 7/2012 | |
| CN | 204028943 | U | 12/2014 | |
| CN | 104659470 | A | 5/2015 | |
| CN | 104953270 | A | 9/2015 | |
| CN | 106104915 | A | 11/2016 | |
| CN | 106575814 | A | 4/2017 | |
| CN | 108156764 | A * | 6/2018 | ........... H01Q 1/2258 |
| CN | 108512959 | A | 9/2018 | |
| CN | 108681414 | A | 10/2018 | |
| CN | 109922177 | A | 6/2019 | |
| CN | 109935959 | A | 6/2019 | |
| CN | 110466323 | A | 11/2019 | |
| CN | 210780903 | U | 6/2020 | |
| CN | 111786076 | A | 10/2020 | |
| CN | 211655064 | U | 10/2020 | |
| EP | 0911906 | A2 * | 4/1999 | |
| EP | 1868263 | A1 | 12/2007 | |
| EP | 3098699 | A1 * | 11/2016 | ........... G06F 3/0412 |
| EP | 2733782 | B1 * | 6/2019 | ............ H01Q 1/243 |
| JP | 2000138512 | A | 5/2000 | |
| WO | WO-2018220893 | A1 * | 12/2018 | ........... H01Q 1/1271 |

* cited by examiner

COVER AND ELECTRONIC DEVICE

CROSS-REFERENCE TO RELATED APPLICATIONS

This application is a National Stage of International Patent Application No. PCT/CN2020/126464 filed on Nov. 4, 2020, which claims priority to Chinese Patent Application No. 201911143874.1 filed on Nov. 20, 2019. Both of the aforementioned applications are hereby incorporated by reference in their entireties.

TECHNICAL FIELD

This application relates to the field of antenna technologies, and in particular, to a cover and an electronic device.

BACKGROUND

With increasing functions of a mobile phone, the mobile phone needs to cover an increasingly wide communication range. In this case, the mobile phone has an increasing requirement for antennas. However, with thinning development of the mobile phone, there is increasingly small space in the mobile phone. Therefore, how to place more antennas in limited space of the mobile phone is one of problems that need to be urgently resolved in the field of antenna structure.

SUMMARY

This application provides a cover on which a plurality of antennas are disposed and an electronic device.

According to a first aspect, this application provides a cover. The cover is applied to an electronic device. The cover includes a cover body and a first line layer. The cover body is made of an insulating material. The first line layer is made of a conductive material. The first line layer is completely built into the cover body. It may be understood that, that the first line layer is completely built into the cover body means that the first line layer is completely surrounded by the cover body. The first line layer is configured to form a radiator, and is coupled to a radio frequency transceiver circuit of the electronic device, that is, a radio frequency signal transmitted by the radio frequency transceiver circuit can be coupled and fed to the first line layer, or the first line layer can convert a received antenna signal into a radio frequency signal, and couple and feed the radio frequency signal to the radio frequency transceiver circuit.

The first line layer includes a plurality of first conducting wires and a plurality of second conducting wires. The plurality of first conducting wires are arranged at intervals in a first direction. The plurality of second conducting wires are arranged at intervals in a second direction. The plurality of first conducting wires and the plurality of second conducting wires are disposed intersecting each other. The first direction is different from the second direction. It may be understood that it may be set that the first direction is perpendicular to the second direction or there is an angle between the first direction and the second direction. A width of each of the first conducting wire and the second conducting wire is less than or equal to 50 micrometers. A distance between two adjacent first conducting wires is greater than or equal to 50 micrometers. A distance between two adjacent second conducting wires is greater than or equal to 50 micrometers.

In this implementation, when the cover is applied to the electronic device, a quantity of antennas in the electronic device can be further increased because the cover can be used to send and receive an antenna signal, and therefore the electronic device can cover a wider communication range.

In addition, the first line layer is completely built into the cover body, to protect the first line layer by using the cover body, so that the first line layer is not easily damaged. In this case, the first line layer has more stable performance of sending and receiving an antenna signal.

It may be understood that when ambient light passes through the cover, the first line layer that includes the first conducting wire and the second conducting wire imposes relatively weak interference and small impact on the ambient light because of a relatively small width of the first conducting wire, a relatively small spacing between two first conducting wires, a relatively small width of the second conducting wire, and a relatively small spacing between two second conducting wires. In this case, the first conducting wire and the second conducting wire impose relatively small impact on appearance consistency of the cover. In other words, when a user views the cover, the first line layer is visually substantially transparent to the user. When a pattern or an identity (Identity, ID) needs to be set on the cover, the first line layer does not affect presentation of the pattern or the ID.

In an implementation, a thickness of each of the first conducting wire and the second conducting wire is less than or equal to 50 micrometers.

It may be understood that when the ambient light passes through the cover, the interference and the impact of the first line layer that includes the first conducting wire and the second conducting wire on the ambient light are further reduced because of a relatively small thickness of the first conducting wire and a relatively small thickness of the second conducting wire. In this case, the first conducting wire and the second conducting wire impose relatively small impact on the appearance consistency of the cover. In other words, when the user views the cover, the first line layer is visually substantially transparent to the user. When a pattern or an identity (Identity, ID) needs to be set on the cover, the first line layer does not affect presentation of the pattern or the ID, in other words, the first line layer imposes relatively small impact on an appearance surface of the cover.

In an implementation, the cover further includes a first ink layer and a second ink layer. The first ink layer is disposed on a surface of the cover body, and is located on one side of the first line layer. The second ink layer is completely built into the cover body, and is stacked on a surface that is of the first line layer and that is away from the first ink layer. A color of the second ink layer and a color of the first ink layer belong to a same color system. For example, the second ink layer is in a color of pink, and the first ink layer is in a color of deep red. Certainly, the color of the second ink layer may be the same as the color of the first ink layer.

It may be understood that the first ink layer is disposed on a surface of the cover, so that overall strength of the cover can be improved and it can be ensured that the cover has a relatively good appearance (for example, the first ink layer may change a color of the surface of the cover, to meet a requirement of the user for a color). In addition, the second ink layer is stacked on the surface that is of the first line layer and that is away from the first ink layer, and the color of the second ink layer and the color of the first ink layer belong to the same color system, so that the first line layer is hidden in the cover body by using the second ink layer, to ensure that the first line layer does not affect or interfere with a display effect of the second ink layer.

In an implementation, the cover body includes a baseboard and a first protective layer. The baseboard is made of an insulating material, for example, glass, organic glass, polyethylene terephthalate (polyethylene terephthalate, PET), polyimide (Polyimide, PI), polymethyl methacrylate (polymethyl methacrylate, PMMA), or a ceramic material.

A plurality of first grooves and a plurality of second grooves are disposed on a same side of the baseboard. The plurality of first grooves are arranged at intervals in the first direction. The plurality of second grooves are arranged at intervals in the second direction. The plurality of first grooves and the plurality of second grooves are disposed intersecting each other. The plurality of first conducting wires are disposed in the plurality of first grooves in a one-to-one correspondence. The plurality of second conducting wires are disposed in the plurality of second grooves in a one-to-one correspondence. The first protective layer is fastened on the baseboard. The first protective layer is on a same side as the plurality of first grooves, and covers the plurality of first conducting wires and the plurality of second conducting wires.

In this implementation, the plurality of first conducting wires are disposed in the plurality of first grooves in a one-to-one correspondence, and the plurality of second conducting wires are disposed in the plurality of second grooves in a one-to-one correspondence, to increase a connection area between the baseboard and each of the first conducting wire and the second conducting wire, so as to improve connection firmness between the baseboard and each of the first conducting wire and the second conducting wire.

In addition, the plurality of first conducting wires are disposed in the plurality of first grooves in a one-to-one correspondence, and the plurality of second conducting wires are disposed in the plurality of second grooves in a one-to-one correspondence, to protect the first conducting wire by using a groove wall of the first groove and protect the second conducting wire by using a groove wall of the second groove. Therefore, when the cover is applied to the electronic device, a case in which the first conducting wire and the second conducting wire are easily damaged due to the fact that the first protective layer is scratched, and consequently the first line layer cannot send or receive an antenna signal is avoided.

In addition, the first protective layer covers the plurality of first conducting wires and the plurality of second conducting wires, so that the first line layer is protected by using the first protective layer, to prevent the user from scratching or damaging the first line layer when using the electronic device.

Furthermore, the first line layer imposes relatively weak interference and small impact on the ambient light, and therefore the first line layer does not affect or interfere with the first protective layer (for example, when a position of the first protective layer needs to be set to be transparent, the first line layer does not affect a transparent effect of the first protective layer at the position).

In an implementation, the first protective layer includes at least one of a plating layer, a coating layer, or a protective film. It may be understood that the coating layer includes a ceramic layer or a hardened layer. The ceramic layer is formed by spraying ceramic powder on the baseboard. The hardened layer may be formed after hardening liquid sprayed on the baseboard is cured.

In this implementation, when the first protective layer includes the at least one of the plating layer, the coating layer, or the protective film, the first protective layer may be used to improve the overall strength of the cover and to ensure that the cover has a relatively good appearance (for example, the first protective layer may increase smoothness of the surface of the cover). In addition, a better effect is achieved when the first protective layer is used to protect the first line layer. In this case, the user is not likely to scratch or damage the first line layer when using the electronic device. Therefore, the first protective layer functions as a "multi-purpose object".

In an implementation, the cover further includes a third line layer. The third line layer is fastened on a side that is of the baseboard and that is away from the first protective layer. It may be understood that when the first ink layer is disposed on the cover body, the third line layer is fastened on a surface that is of the first ink layer and that is away from the baseboard. When the first ink layer is not disposed on the cover body, the third line layer is fastened on a surface that is of the baseboard and that is away from the first protective layer. The third line layer is made of a conductive material. The third line layer is configured to form a radiator. The third line layer is coupled to the first line layer and the radio frequency transceiver circuit of the electronic device, that is, a radio frequency signal can be coupled and fed to the first line layer by using the third line layer, and can also be coupled and fed to the third line layer by using the first line layer.

In this implementation, the third line layer is disposed on a first surface of the baseboard, to increase a quantity of radiators, so that the electronic device can cover a wider communication range. In addition, the baseboard can be further fully utilized, in other words, utilization of the baseboard can be improved.

In an implementation, the third line layer is formed on the baseboard through LDS. The third line layer may be but is not limited to a precious metal material such as gold, silver, copper, aluminum, or platinum, a conductive oxide, or graphene.

In an implementation, the cover body further includes a second protective layer. A material of the second protective layer may be but is not limited to glass, PMMA, PI, PET, or ceramic. The second protective layer is disposed on the surface that is of the baseboard and that is away from the first protective layer, and covers the third line layer.

In this implementation, the second protective layer is disposed on the surface that is of the baseboard and that is away from the first protective layer, and covers the third line layer, so that the third line layer is protected by using the second protective layer, to avoid a case in which the third line layer is damaged due to scratching.

In an implementation, the cover body includes a baseboard, a first adhesive layer, and a first base that are stacked. The first adhesive layer is connected between the baseboard and the first base. The baseboard is made of an insulating material, for example, glass, organic glass, PET, PI, PMMA, or a ceramic material. A material of the first base may be but is not limited to a polymer colloid. The first adhesive layer may be but is not limited to optical clear adhesive.

A plurality of first grooves and a plurality of second grooves are disposed on a side that is of the first base and that is close to the baseboard. The plurality of first grooves are arranged at intervals in the first direction. The plurality of second grooves are arranged at intervals in the second direction. The first direction is different from the second direction. The plurality of first grooves and the plurality of second grooves are disposed intersecting each other. The plurality of first conducting wires are disposed in the plurality of first grooves in a one-to-one correspondence. The plurality of second conducting wires are disposed in the plurality of second grooves in a one-to-one correspondence.

The first adhesive layer covers the plurality of first conducting wires and the plurality of second conducting wires.

In this implementation, the plurality of first conducting wires are disposed in the plurality of first grooves in a one-to-one correspondence, and the plurality of second conducting wires are disposed in the plurality of second grooves in a one-to-one correspondence, to increase a connection area between the first base and each of the first conducting wire and the second conducting wire, so as to improve connection firmness between the first base and each of the first conducting wire and the second conducting wire.

In addition, the plurality of first conducting wires are disposed in the plurality of first grooves in a one-to-one correspondence, and the plurality of second conducting wires are disposed in the plurality of second grooves in a one-to-one correspondence, to protect the first conducting wire by using a groove wall of the first groove and protect the second conducting wire by using a groove wall of the second groove. Therefore, when the cover is applied to the electronic device, a case in which the first conducting wire and the second conducting wire are easily damaged due to the fact that the first base is scratched, and consequently the first line layer cannot send or receive an antenna signal is avoided.

Furthermore, the plurality of first conducting wires and the plurality of second conducting wires are located at the first base and the first adhesive layer, and therefore the first line layer can be effectively protected by using the first base and the first adhesive layer, in other words, the first line layer can be prevented from being scratched or damaged when the user uses the electronic device.

In an implementation, the cover body further includes a second adhesive layer and a second base. The second adhesive layer and the second base are located on a side that is of the baseboard and that is away from the first adhesive layer. The second adhesive layer is bonded between the baseboard and the second base.

A plurality of third grooves and a plurality of fourth grooves are disposed at the second base. The plurality of third grooves are arranged at intervals in the first direction. The plurality of fourth grooves are arranged at intervals in the second direction. The plurality of third grooves and the plurality of fourth grooves are disposed intersecting each other. A width of each of the third groove and the fourth groove is less than or equal to 50 micrometers. A distance between two adjacent third grooves is greater than or equal to 50 micrometers, and a distance between two adjacent fourth grooves is greater than or equal to 50 micrometers.

A third conducting wire is disposed in the third groove. A fourth conducting wire is disposed in the fourth groove. The third conducting wire and the fourth conducting wire form a third line layer, and the third line layer is coupled to the first line layer and the radio frequency transceiver circuit.

It may be understood that when the first conducting wire is disposed in the third groove, and the fourth conducting wire is disposed in the fourth groove, the width of each of the third conducting wire and the second conducting wire is less than or equal to 50 micrometers, the distance between the two adjacent third conducting wires is greater than or equal to 50 micrometers, and the distance between the two adjacent fourth conducting wires is greater than or equal to 50 micrometers. In this case, interference and impact of the third line layer that includes the third conducting wire and the fourth conducting wire on the ambient light are further reduced because of a relatively small thickness of the third conducting wire and a relatively small thickness of the fourth conducting wire. In this case, the third conducting wire and the fourth conducting wire impose relatively small impact on the appearance consistency of the cover. In other words, when the user views the cover, the third line layer is visually substantially transparent to the user.

In an implementation, a depth of each of the third groove and the fourth groove is less than or equal to 50 micrometers.

It may be understood that when the ambient light passes through the cover, the interference and the impact of the first line layer that includes the first conducting wire and the second conducting wire on the ambient light are further reduced because of a relatively small thickness of the first conducting wire and a relatively small thickness of the second conducting wire. In this case, the first conducting wire and the second conducting wire impose relatively small impact on the appearance consistency of the cover.

In an implementation, the first line layer includes a first sublayer and a second sublayer that are stacked. Resistivity of the second sublayer is less than resistivity of the first sublayer. For example, the first sublayer is silver, and the second sublayer is copper.

It may be understood that the resistivity of the second sublayer is less than the resistivity of the first sublayer, and therefore overall resistivity of the first line layer is significantly reduced. When overall impedance of the first line layer is significantly reduced, the first line layer has relatively high performance of sending and receiving an antenna signal.

In an implementation, the first line layer further includes a third sublayer. The third sublayer is disposed on a surface that is of the second sublayer and that is away from the first sublayer. Oxidation resistance of the third sublayer is higher than oxidation resistance of the second sublayer. For example, the second sublayer is copper, and the third sublayer is nickel.

In this implementation, when the third sublayer is stacked with the second sublayer, the third sublayer may prevent the second sublayer from being oxidized, to ensure that the overall impedance of the first line layer is not significantly increased due to an increase in impedance of the second sublayer, so as to ensure that the performance of sending and receiving an antenna signal by the first line layer is not significantly degraded. In addition, the third sublayer is not easily oxidized, and therefore impedance of the third sublayer is not significantly increased, to ensure that the performance of sending and receiving an antenna signal by the first line layer is not significantly degraded.

In an implementation, there are a plurality of first line layers. The plurality of first line layers are located at different positions in the cover body.

It may be understood that when the cover is applied to the electronic device, a hand of the user does not simultaneously cover the plurality of first line layers, to ensure that the hand of the user does not simultaneously interfere with or affect sending or receiving of an antenna signal by the plurality of first line layers.

In an implementation, the cover further includes a pattern layer. The pattern layer is completely built into the cover body, and is disposed at a same layer as the first line layer. The pattern layer includes a plurality of first traces and a plurality of second traces. The plurality of first traces are arranged at intervals in the first direction. The plurality of second traces are arranged at intervals in the second direction. Some of the plurality of first traces are arranged in alignment with the plurality of first conducting wires in a one-to-one correspondence. Some of the plurality of second traces are arranged in alignment with the plurality of second conducting wires in a one-to-one correspondence.

Each of the first trace and the second trace uses a conductive material, the first trace includes a plurality of first trace segments disposed at intervals, and the second trace includes a plurality of second trace segments disposed at intervals. Alternatively, each of the first trace and the second trace uses an insulating material.

In this implementation, some first traces are arranged in alignment with the plurality of first conducting wires in a one-to-one correspondence, and some second traces are arranged in alignment with the plurality of second conducting wires in a one-to-one correspondence, so that the first line layer is hidden in the pattern layer, to implement relatively high appearance consistency for the cover. In other words, when the user views the cover, the user views a substantially same situation at all positions on the cover. In other words, the first conducting wire and the second conducting wire impose relatively small impact on an appearance of the cover.

In addition, when each of the first trace and the second trace uses a conductive material, the first trace includes a plurality of first trace segments disposed at intervals, and the second trace includes a plurality of second trace segments disposed at intervals, the plurality of first trace segments are disconnected from each other, and the plurality of second trace segments are disconnected from each other. In other words, the first trace and the second trace cannot form a continuous line layer. In this case, when a radio frequency signal is coupled and fed to the pattern layer, the plurality of first trace segments and the plurality of second trace segments cannot radiate an antenna signal. Therefore, the pattern layer imposes relatively small impact and weak interference on sending and receiving of an antenna signal by the first line layer.

In addition, when each of the first trace and the second trace uses an insulating material, the first trace and the second trace cannot radiate an antenna signal. Therefore, the pattern layer imposes no impact or interference on sending and receiving of an antenna signal by the first line layer. It may be understood that the first trace and the second trace may be disposed in a strip shape, or may be disposed in a shape of a line segment.

In an implementation, a width of each of the first trace and the second trace is less than or equal to 50 micrometers, a thickness of each of the first trace and the second trace is less than or equal to 50 micrometers, a distance between two adjacent first traces is greater than or equal to 50 micrometers, and a distance between two adjacent second traces is greater than or equal to 50 micrometers.

It may be understood that when the ambient light passes through the cover, the first trace and the second trace impose relatively weak interference and small impact on the ambient light because of a relatively small width of the first trace, a relatively small spacing between two first traces, a relatively small width of the second trace, and a relatively small spacing between two second traces. In this case, the first trace and the second trace impose relatively small impact on the appearance consistency of the cover. In other words, when the user views the cover, the first trace and the second trace are visually substantially transparent to the user. When a pattern or an identity (Identity, ID) needs to be set on the cover, the first line layer does not affect presentation of the pattern or the ID.

In an implementation, when each of the first trace and the second trace uses a conductive material, a spacing distance between every two first trace segments ranges from 1 micrometer to 20 micrometers. In this case, it can be ensured that every two first trace segments are disconnected from each other, and the first trace cannot form a continuous line layer. In this case, when a radio frequency signal is coupled and fed to the pattern layer, the plurality of first trace segments cannot radiate an antenna signal. Therefore, the first trace imposes relatively small impact and weak interference on sending and receiving of an antenna signal by the first line layer. In addition, when the user views the cover, the plurality of first trace segments can better hide the first line layer in a visual effect.

In an implementation, when each of the first trace and the second trace uses a conductive material, a distance between every two second trace segments ranges from 1 micrometer to 20 micrometers. In this case, it can be ensured that every two second trace segments are disconnected from each other, and the second trace cannot form a continuous line layer. In this case, when a radio frequency signal is coupled and fed to the pattern layer, the plurality of second trace segments cannot radiate an antenna signal. Therefore, the second trace imposes relatively small impact and weak interference on sending and receiving of an antenna signal by the first line layer. In addition, when the user views the cover, the plurality of second trace segments can better hide the first line layer in a visual effect.

In an implementation, the cover is a protective cover of a display, a rear cover, a protective cover of an optical module, or a decorative part of an optical module of the electronic device.

When the cover is the protective cover of the display, the rear cover, or the protective cover of the optical module of the electronic device, the quantity of antennas in the electronic device is significantly increased, and therefore the electronic device can cover a wider communication range. In addition, the first line layer of the cover does not need to occupy internal space of the electronic device. In this case, the first line layer does not affect or interfere with an electronic component in the internal space of the electronic device. Furthermore, the protective cover of the display, the rear cover, or the protective cover of the optical module has a function of sending and receiving an antenna signal, and therefore the protective cover of the display, the rear cover, or the protective cover of the optical module functions as a "multi-purpose object".

In addition, the first line layer does not need to occupy the internal space of the electronic device. In this case, the first line layer does not affect or interfere with the electronic component in the electronic device.

According to a second aspect, this application provides an electronic device. The electronic device includes a radio frequency transceiver circuit and the foregoing cover. The radio frequency transceiver circuit is configured to send and receive a signal by using a first line layer of the cover.

In this implementation, the cover of the electronic device can be used to send and receive an antenna signal, and therefore a quantity of antennas in the electronic device can be further increased, and the electronic device can cover a wider communication range.

In addition, the first line layer is completely built into a cover body, to protect the first line layer by using the cover body, so that the first line layer is not easily damaged. In this case, the first line layer has more stable performance of sending and receiving an antenna signal.

In an implementation, the cover is a rear cover of the electronic device, the cover encloses accommodation space, and the radio frequency transceiver circuit is mounted in the accommodation space.

It may be understood that when the cover is the rear cover of the electronic device, the quantity of antennas in the electronic device is increased, and in this case, the electronic device can cover a wider communication range. In addition, the first line layer does not need to occupy the accommodation space. In this case, the first line layer does not affect or interfere with an electronic component in the accommodation space. Furthermore, the rear cover can be used to protect the electronic component in the accommodation space, and can be further used to send and receive an antenna signal, and therefore the rear cover functions as a "multi-purpose object".

In an implementation, the electronic device further includes a housing and an optical module. It may be understood that the optical module may be a camera module, a structured light module, a fingerprint module, or the like. The housing encloses accommodation space. Both the radio frequency transceiver circuit and the optical module are located in the accommodation space. A via hole is disposed on the housing. The via hole connects the accommodation space to the outside of the electronic device. The cover is mounted on the housing, and the cover covers the via hole. The optical module collects ambient light or projects light by using the cover.

It may be understood that when the cover is used as a protective cover of the optical module, the protective cover of the optical module may be used to send and receive an antenna signal. In this case, the cover functions as a "multi-purpose object". In addition, the first line layer of the cover does not need to occupy the accommodation space. In this case, the first line layer does not affect or interfere with an electronic component in the accommodation space.

Furthermore, the first line layer imposes relatively weak interference and small impact on ambient light, and therefore the first line layer imposes relatively small impact on collection of an ambient light or projection of light by the optical module.

In an implementation, the cover includes an imaging region and a non-imaging region connected to the imaging region. It may be understood that when ambient light passes through the imaging region, the ambient light may be received by the optical module. When ambient light passes through the non-imaging region, the ambient light cannot be received by the optical module. The optical module collects ambient light or projects light by using the imaging region. The first line layer is disposed in the non-imaging region. In this case, the first line layer can effectively use space in which the non-imaging region of the cover is located, to improve utilization of the cover. In addition, the first line layer is completely separated from the imaging region. In this case, the first line layer hardly affects collection of an ambient light by the optical module.

In an implementation, a pattern layer is located in the non-imaging region. In this case, the pattern layer can effectively use the space in which the non-imaging region of the cover is located, to improve utilization of the cover. In addition, the pattern layer is completely separated from the imaging region. In this case, the pattern layer hardly affects collection of an ambient light by the optical module.

Furthermore, the pattern layer is disposed in the non-imaging region, so that the first line layer is hidden in the pattern layer, to implement relatively high appearance consistency for the non-imaging region of the cover. In other words, when a user views the cover, the user views a substantially same situation at all positions in the non-imaging region of the cover. In other words, a first conducting wire and a second conducting wire impose relatively small impact on an appearance of the non-imaging region.

In an implementation, the electronic device further includes a housing and a display. The display is mounted on the housing. The display and the housing enclose accommodation space. The radio frequency transceiver circuit is mounted in the accommodation space. The cover is fixedly connected to a side that is of the display and that is away from the accommodation space.

It may be understood that when the cover is used as a protective cover of the display, the protective cover of the display may be used to send and receive an antenna signal. In this case, the cover functions as a "multi-purpose object". In addition, the first line layer of the cover does not need to occupy the accommodation space. In this case, the first line layer does not affect or interfere with an electronic component in the accommodation space.

Furthermore, the first line layer imposes relatively weak interference and small impact on ambient light, and therefore the first line layer imposes relatively small impact on display light emitted by the display.

In an implementation, the cover includes a display region and a non-display region connected to the display region, the display light emitted by the display is emitted through the display region, and the first line layer is disposed in the non-display region.

It may be understood that the display region is a region, on the cover, that can allow the display light to pass through, and the non-display region is a region, on the cover, that cannot allow the display light to pass through. In this case, when the first line layer is located in the non-display region, the first line layer can effectively use space in which the non-display region is located, to improve utilization of the cover. In addition, the first line layer can be completely separated from the display region, to reduce impact and interference on the display light emitted by the display.

In an implementation, a pattern layer is located in the non-display region. In this case, the pattern layer can effectively use the space in which the non-display region of the cover is located, to improve utilization of the cover. In addition, the pattern layer is completely separated from the display region. In this case, the pattern layer hardly affects the display light emitted by the display.

Furthermore, the pattern layer is disposed in the non-display region, so that the first line layer is hidden in the pattern layer, to implement relatively high appearance consistency for the non-display region of the cover. In other words, when a user views the cover, the user views a substantially same situation at all positions in the non-display region of the cover. In other words, a first conducting wire and a second conducting wire impose relatively small impact on an appearance of the non-display region.

In an implementation, the electronic device further includes a conductive film. The conductive film is located between the display and the cover. The conductive film is electrically connected to the radio frequency transceiver circuit. The conductive film forms a radiator. The conductive film is coupled to the first line layer and the radio frequency transceiver circuit. In this case, the radio frequency transceiver circuit transmits a radio frequency signal, the radio frequency signal is transmitted to the conductive film, and is fed to the first line layer by using the conductive film, and the first line layer radiates an antenna signal based on the radio frequency signal. In addition, when receiving an antenna signal from the outside of the electronic device, the first line layer converts the antenna signal into a radio frequency signal, and the radio frequency signal is fed to the conductive film by using the first line layer, and is transmitted to the radio frequency transceiver circuit by using the conductive film.

In an implementation, the electronic device further includes a signal trace and a circuit board. Both the signal trace and the circuit board are located in the accommodation space. The signal trace includes a first part and a second part. One end of the first part is connected to the display, and the other end is connected to the circuit board. In an implementation, the other end of the first part is electrically connected to a central processing unit by using the circuit board. In this case, when the user needs the display to display an image, the user enters a display instruction, the display instruction is transmitted to the central processing unit, and the central processing unit controls, based on the display instruction, the display to display an image. In addition, one end of the second part is connected to the conductive film, and the other end is connected to the radio frequency transceiver circuit. The one end of the second part of the signal trace is electrically connected to the conductive film, and the other end is electrically connected to the radio frequency transceiver circuit by using the circuit board. In this case, a radio frequency signal transmitted by the radio frequency transceiver circuit can be transmitted to the conductive film by using the second part. In addition, a radio frequency signal fed to the conductive film by using the first line layer can also be transmitted to the radio frequency transceiver circuit by using the second part.

In an implementation, the electronic device further includes a circuit board and a holder. The circuit board is located on one side of the cover. The radio frequency transceiver circuit is disposed on the circuit board. The holder is fixedly connected to the circuit board. A part of the holder forms a second line layer, or a second line layer is disposed on the holder. The second line layer forms a radiator. The second line layer is electrically connected to the radio frequency transceiver circuit. The second line layer is coupled to the first line layer and the radio frequency transceiver circuit.

It may be understood that when the radio frequency transceiver circuit transmits a radio frequency signal, the radio frequency signal is transferred to the second line layer. In this case, the radio frequency signal is coupled and fed to the first line layer by using the second line layer, and the first line layer radiates an antenna signal to the outside of the electronic device. In addition, the first line layer may further receive an antenna signal from the outside of the electronic device, and convert the antenna signal into a radio frequency signal. The radio frequency signal is coupled and fed to the second line layer by using the first line layer, and is transmitted to the radio frequency transceiver circuit by using the second line layer.

In this implementation, the second line layer is disposed on the holder, so that a radio frequency signal is fed to the first line layer while integrity of the cover is ensured, and accordingly the first line layer radiates an antenna signal. In addition, there is a relatively long distance between the first line layer and the second line layer, and therefore there is a relatively large clearance region between the first line layer and the second line layer. In this case, the first line layer and the second line layer have better antenna performance.

In an implementation, the electronic device further includes a housing, an optical module, and a protective cover. The housing encloses accommodation space. Both the radio frequency transceiver circuit and the optical module are located in the accommodation space. A via hole is disposed on the housing. The via hole connects the accommodation space to the outside of the electronic device. The cover is disposed around the protective cover, and is connected to a peripheral side surface of the protective cover. The cover is mounted on the housing. The cover and the protective cover jointly cover the via hole. The optical module collects ambient light or projects light by using the protective cover.

It may be understood that when the cover is used as a decorative part of the optical module, the decorative part of the optical module may be used to send and receive an antenna signal. In this case, the decorative part of the optical module functions as a "multi-purpose object". In addition, the first line layer of the cover does not need to occupy the accommodation space. In this case, the first line layer does not affect or interfere with an electronic component in the accommodation space.

This application provides a method for manufacturing the cover. The method includes the following steps.

A first base is formed on a substrate. In an implementation, the substrate may be but is not limited to PET or PI. A surface of the substrate is coated with a polymer colloid, and the first base is formed after the polymer colloid is cured.

A plurality of first grooves arranged at intervals in a first direction and a plurality of second grooves arranged at intervals in a second direction are formed on a surface that is of the first base and that is away from the substrate. The plurality of first grooves and the plurality of second grooves are connected to each other.

The first groove and the second groove are filled with a conductive material. In an implementation, the conductive material is silver paste. In another implementation, the conductive material may be a precious metal material such as copper, gold, aluminum, or platinum, or a conductive oxide.

A first adhesive layer is formed on the surface that is of the first base and that is away from the substrate. The first adhesive layer may be but is not limited to optical clear adhesive.

A surface that is of the first adhesive layer and that is away from the first base is bonded to a baseboard, and the substrate is torn off.

In this implementation, according to the method, the first line layer may be completely built into the cover, so that the first line layer is used as a radiator of an antenna module. It may be understood that for the cover formed by using the method, it may be implemented that the first line layer is formed and surrounded by the first base and the first adhesive layer, to ensure that the first line layer is not easily damaged. In addition, the method for manufacturing the cover is simple and easy to implement.

DETAILED DESCRIPTION OF ILLUSTRATIVE EMBODIMENTS

The following describes embodiments of this application with reference to the accompanying drawings in embodiments of this application.

Figure 1:
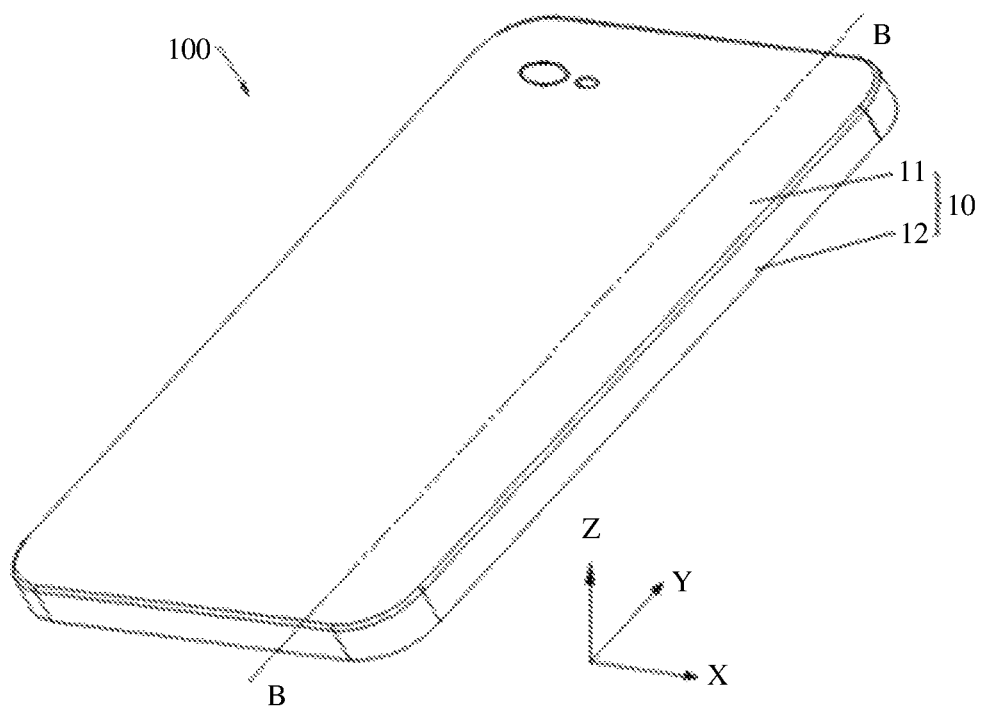
FIG. 1 is a schematic diagram of a structure of an implementation of an electronic device according to an embodiment of this application.

FIG. 1 is a schematic diagram of a structure of an implementation of an electronic device according to an embodiment of this application. The electronic device 100 may be a tablet computer, a mobile phone, a camera, a personal computer, a notebook computer, a vehicle-mounted device, a wearable device, a pair of augmented reality (augmented reality, AR) glasses, an AR helmet, a pair of virtual reality (virtual reality, VR) glasses, or a VR helmet. In the embodiment shown in FIG. 1, the electronic device 100 is described by using the mobile phone as an example. For ease of description, as shown in FIG. 1, a width direction of the electronic device 100 is defined as an X axis, a length direction of the electronic device 100 is a Y axis, and a thickness direction of the electronic device 100 is a Z axis.

Figure 2:
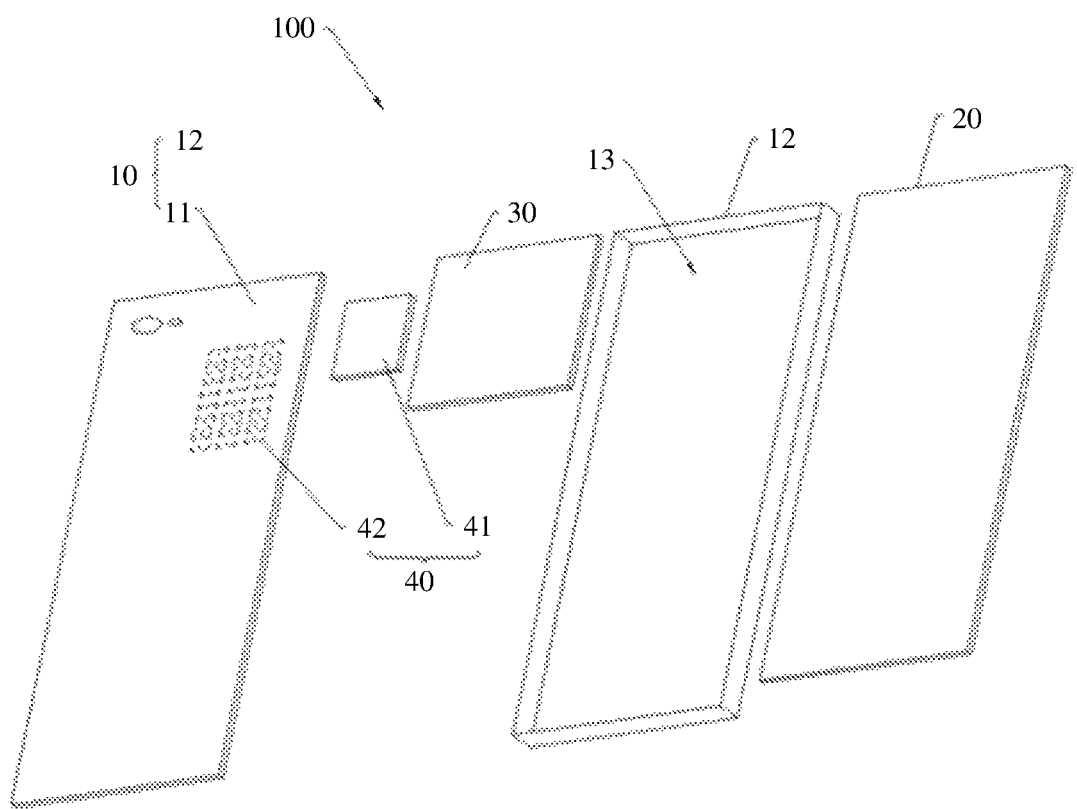
FIG. 2 is an exploded schematic diagram of the electronic device shown in FIG. 1.

FIG. 2 is an exploded schematic diagram of the electronic device 100 shown in FIG. 1.

The electronic device 100 includes a housing 10, a screen 20, a circuit board 30, and an antenna module 40.

The housing 10 includes a rear cover 11 and a frame 12. The rear cover 11 and the screen 20 are disposed opposite to each other. The rear cover 11 and the screen 20 are mounted on two opposite sides of the frame 12. In this case, the rear cover 11, the frame 12, and the screen 20 jointly enclose accommodation space 13. The accommodation space 13 may be used to accommodate an electronic component, for example, a battery, a speaker, a microphone, or a receiver, of the electronic device 100. It is shown in FIG. 1 that the rear cover 11, the frame 12, and the screen 20 form a structure substantially in a cuboid shape.

In an implementation, the rear cover 11 is fixedly connected to the frame 12 by using adhesive. In another implementation, the rear cover 11 and the frame 12 may form an integral structure, in other words, the rear cover 11 and the frame 12 are integrally formed.

In addition, the circuit board 30 is mounted in the accommodation space 13. The circuit board 30 may be configured to accommodate an electronic component, for example, a central processing unit (central processing unit, CPU) or a memory. The central processing unit is configured to invoke electronic device instructions, so that the electronic device 100 performs a corresponding operation. The memory is configured to store electronic device program code. The electronic device program code includes the electronic device instructions.

In addition, the antenna module 40 is configured to receive and transmit an antenna signal. Specifically, the antenna module 40 includes a radio frequency transceiver circuit 41 and a radiator 42. A position of the radiator 42 is not limited to a position that is of the radiator 42 on the housing 10 and that is shown in FIG. 2. For example, in FIG. 20, the radiator 42 may be disposed on a protective cover, namely, a first cover 60, of an optical module. Alternatively, in FIG. 24, the radiator 42 may be disposed on a protective cover of the screen 20, namely, a second cover 21 of the screen 20.

The radio frequency transceiver circuit 41 is located in the accommodation space 13. Specifically, the radio frequency transceiver circuit 41 may be disposed on the circuit board 30. The radio frequency transceiver circuit 41 is configured to transmit and receive a radio frequency signal.

In an implementation, the radio frequency transceiver circuit 41 includes a radio frequency transceiver chip that includes an independent module. The radio frequency transceiver chip is configured to transmit and receive a radio frequency signal. It may be understood that the radio frequency transceiver chip that includes an independent module is disposed, so that a function of transmitting and receiving a radio frequency signal can be independently run, to improve efficiency of transmitting an antenna signal, so as to improve antenna performance. In addition, the radio frequency transceiver circuit 41 may further include a component such as a capacitor, an inductor, or a resistor. The capacitor, the inductor, or the resistor is configured to assist in transmission of a radio frequency signal, for example, amplify the radio frequency signal. In another implementation, the radio frequency transceiver circuit 41 may include a central processing unit. In this case, the function of transmitting and receiving a radio frequency signal is integrated into the central processing unit. It may be understood that the central processing unit has the function of transmitting and receiving a radio frequency signal, and therefore space occupied by one chip may be saved inside the electronic device 100, thereby improving utilization of internal space of the electronic device 100. In addition, the function of transmitting and receiving a radio frequency signal may be alternatively integrated into another chip, for example, a battery management chip.

In addition, the radiator 42 is configured to: when receiving a radio frequency signal transmitted by the radio frequency transceiver circuit 41, radiate an antenna signal to the outside of the electronic device 100 based on the radio frequency signal. Alternatively, the radiator 42 may be configured to: receive an antenna signal from the outside of the electronic device 100, convert the antenna signal into a radio frequency signal, and transmit the radio frequency signal to the radio frequency transceiver circuit 41.

In this application, the radiator 42 is disposed in a plurality of manners. Three manners of disposing the radiator 42 are described below in detail with reference to related drawings.

A first embodiment in which the radiator 42 is a part of the housing 10 is described below in detail with reference to FIG. 2. In this embodiment, the radiator 42 is a part of the rear cover 11. Certainly, the position of the radiator 42 is not limited to a position that is shown in FIG. 2 and that indicates that the radiator 42 is a part of the rear cover 11. In another implementation, the radiator 42 may be a part of the frame 12.

It may be understood that when the radiator 42 is a part of the housing 10, a quantity of antennas in the electronic device 100 is increased, and in this case, the electronic device 100 can cover a wider communication range. In addition, the radiator 42 does not need to occupy the accommodation space 13. In this case, the radiator 42 does not affect or interfere with the electronic component in the accommodation space 13. Furthermore, the housing 10 can be used to protect the electronic component in the accommodation space 13, and can be further used to send and receive an antenna signal, and therefore the housing 10 functions as a "multi-purpose object".

Figure 3:
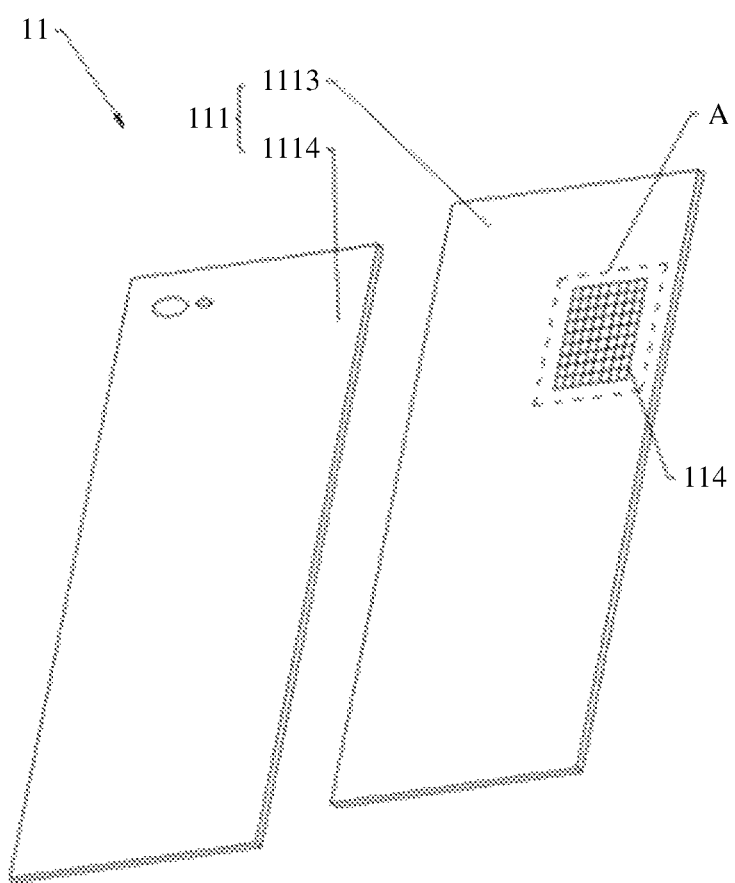
FIG. 3 is an exploded schematic diagram of an implementation of a rear cover shown in FIG. 2.

Referring to FIG. 3, with reference to FIG. 2, FIG. 3 is an exploded schematic diagram of an implementation of the rear cover shown in FIG. 2. The rear cover 11 includes a rear cover body 11 and a first line layer 114 that is completely built into the rear cover body 11. The first line layer 114 is configured to form the radiator 42, and is coupled to the radio frequency transceiver circuit 41. The first line layer 114 uses a conductive material. For example, the first line layer 114 may be but is not limited to a precious metal material such as gold, silver, copper, aluminum, or platinum, and a conductive oxide. It may be understood that, that the first line layer 114 is completely built into the rear cover body 111 means that the first line layer 114 is completely surrounded by the rear cover body 111. In addition, that the first line layer 114 is coupled to the radio frequency transceiver circuit 41 means that a radio frequency signal transmitted by the radio frequency transceiver circuit 41 can be coupled and fed to the first line layer 114, or the first line layer 114 can convert a received antenna signal into a radio frequency signal, and couple and feed the radio frequency signal to the radio frequency transceiver circuit 41.

It may be understood that the first line layer 114 is completely built into the rear cover body 111, to protect the first line layer 114 by using the rear cover body 11, so that the first line layer 114 is not easily damaged. In this case, the first line layer 114 has more stable performance of sending and receiving an antenna signal. In addition, the rear cover body 11 is an exposed component of the electronic device 100, and therefore when the first line layer 114 is disposed on the rear cover body 11, the electronic component in the accommodation space 13 imposes relatively small impact or weak interference on an antenna signal radiated by the first line layer 114, to ensure that the first line layer 114 has stable antenna performance.

In this embodiment, the first line layer 114 is completely built into the rear cover body 11 in a plurality of disposing manners. Two disposing manners are described below in detail with reference to related drawings.

First implementation: Referring to FIG. 3 again, the rear cover body 11 includes a baseboard 1113 and a first protective layer 1114 stacked on the baseboard 1113. The first line layer 114 is surrounded by the baseboard 1113 and the first protective layer 1114. It may be understood that the baseboard 1113 is made of an insulating material, for example, glass, organic glass, polyethylene terephthalate (polyethylene terephthalate, PET), polyimide (Polyimide, PI), polymethyl methacrylate (polymethyl methacrylate, PMMA), or a ceramic material.

In addition, the first protective layer 1114 may be used to improve overall strength of the rear cover 11 and to ensure that the rear cover 11 has a relatively good appearance (for example, the first protective layer 1114 may increase smoothness of a surface of the rear cover 11). In this case, the first protective layer 1114 covers the first line layer 114, so that the first line layer 114 is protected by using the first protective layer 1114, to prevent a user from scratching or damaging the first line layer 114 when using the electronic device 100. In this case, the first protective layer 1114 functions as a "multi-purpose object".

Figure 4:
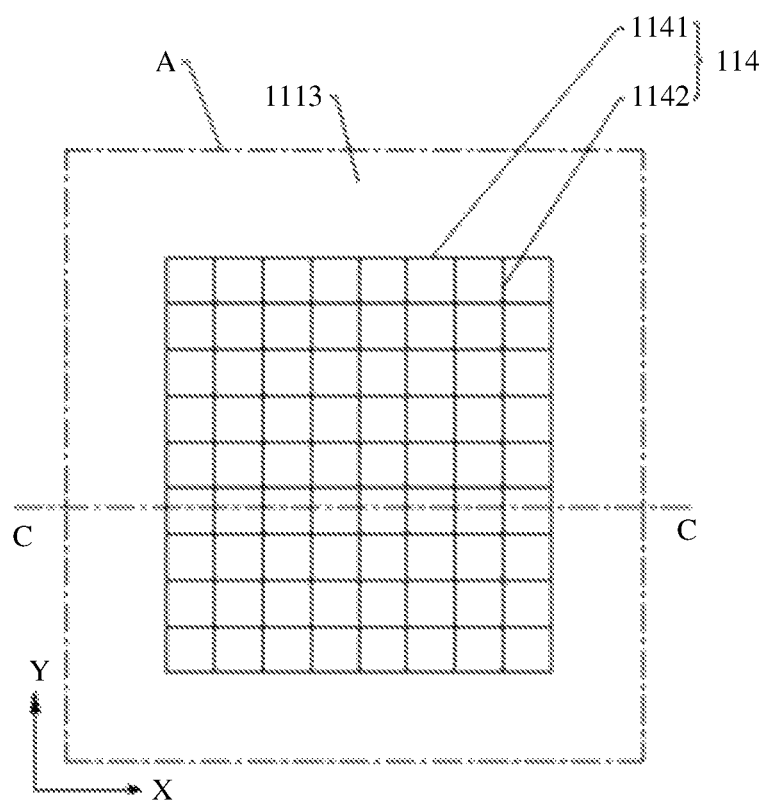
FIG. 4 is an enlarged schematic diagram of the rear cover shown in FIG. 3 at a position A.

FIG. 4 is an enlarged schematic diagram of the rear cover shown in FIG. 3 at a position A.

The first line layer 114 includes a plurality of first conducting wires 1141 and a plurality of second conducting wires 1142. The plurality of first conducting wires 1141 are arranged at intervals in a first direction. The plurality of second conducting wires 1142 are arranged at intervals in a second direction. The plurality of first conducting wires 1141 and the plurality of second conducting wires 1142 are disposed intersecting each other. The first direction is different from the second direction. In this embodiment, an example in which the first direction is a Y-axis direction, and the second direction is an X-axis direction is used. A shape of the first line layer 114 is not limited to a rectangular grid shape shown in FIG. 4. The first line layer 114 may be alternatively in a rhombic grid shape.

It may be understood that it may be set that there is an angle between the first direction and the second direction. In other words, the angle between the first direction and the second direction is greater than 0° and is less than 180°. In addition, when the plurality of first conducting wires 1141 are arranged at intervals in the first direction, every two first conducting wires 1141 may not be disposed in parallel, in other words, it may be set that there is an angle between every two first conducting wires 1141. In addition, when the plurality of second conducting wires 1142 are arranged at intervals in the second direction, every two second conducting wires 1142 may not be disposed in parallel, in other words, it may be set that there is an angle between every two second conducting wires 1142.

Figure 5:
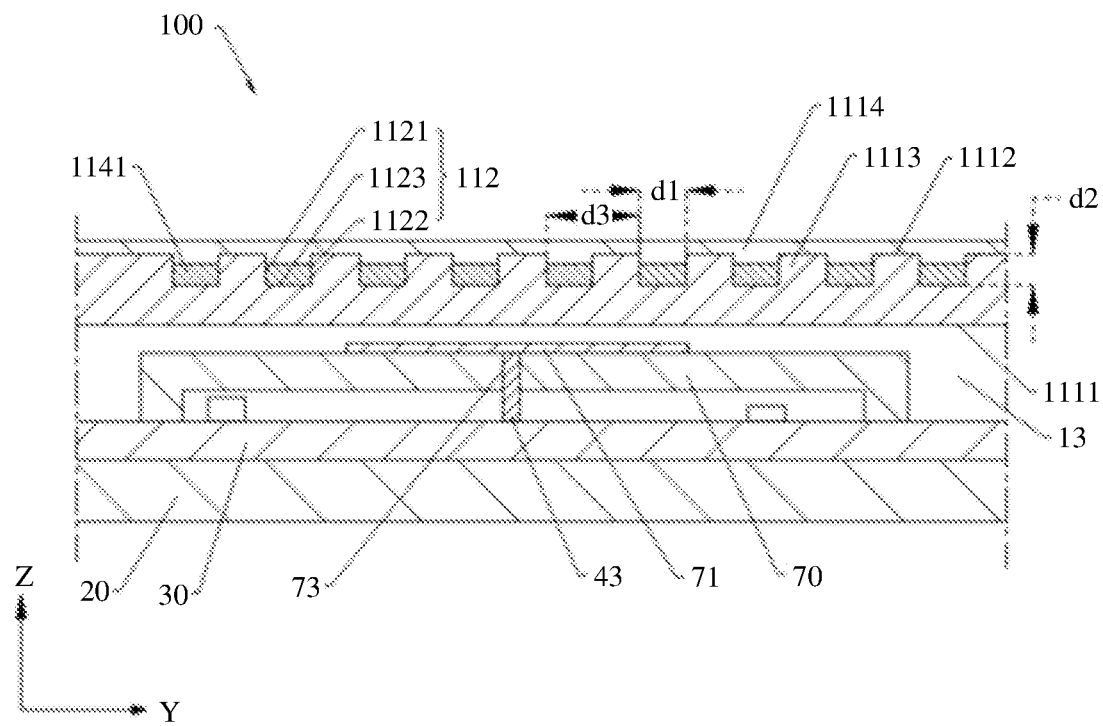
FIG. 5 is a schematic cross-sectional diagram of an implementation of the electronic device shown in FIG. 1 along a line B-B.

Referring to FIG. 5, with reference to FIG. 4, FIG. 5 is a schematic cross-sectional diagram of an implementation of the electronic device shown in FIG. 1 along a line B-B.

The baseboard 1113 includes a first surface 1111 and a second surface 1112 disposed opposite to each other. The first surface 1111 faces the accommodation space 13. The second surface 1112 is away from the accommodation space 13. In other words, the first surface 1111 is an inner surface of the baseboard 1113, and the second surface 1112 is an outer surface of the baseboard 1113.

In addition, a plurality of first grooves 112 arranged at intervals in the first direction are disposed on the rear cover body 11. An opening of each first groove 112 is located on the second surface 1112. In the first direction, each first groove 112 includes a first groove sidewall 1121 and a second groove sidewall 1122 that are disposed opposite to each other. A distance d1 between the first groove sidewall 1121 and the second groove sidewall 1122 is less than or equal to 50 micrometers, in other words, a groove width of the first groove 112 is less than or equal to 50 micrometers. In addition, each first groove 112 further includes a first bottom wall 1123. The first bottom wall 1123 is connected between the first groove sidewall 1121 and the second groove sidewall 1122. A distance d2 between the first bottom wall 1123 and the second surface 1112 of the baseboard 1113 is less than or equal to 50 micrometers, in other words, a groove depth of the first groove 112 is less than or equal to 50 micrometers. In addition, a distance d3 between first groove sidewalls 1121 of every two first grooves 112 is greater than or equal to 50 micrometers, in other words, a groove distance between every two first grooves 112 is greater than or equal to 50 micrometers.

In addition, the plurality of first conducting wires 1141 are disposed in the plurality of first grooves 112 in a one-to-one correspondence. The first groove 112 may be completely filled with the first conducting wire 1141, or the first groove 112 may be partially filled with the first conducting wire 1141. In addition, the first protective layer 1114 covers the first conducting wire 1141.

When the first conducting wire 1141 is disposed in the first groove 112 of the foregoing size, a width of the first conducting wire 1141 in a width direction of the first groove 112 is less than or equal to 50 micrometers, a thickness of the first conducting wire 1141 in a thickness direction of the first groove 112 is less than or equal to 50 micrometers, and a distance between two adjacent first conducting wires 1141 is greater than or equal to 50 micrometers. In other words, a width of the first conducting wire 1141 in the Y direction is less than or equal to 50 micrometers, a thickness of the first conducting wire 1141 in a Z direction is less than or equal to 50 micrometers, and the distance between the two adjacent first conducting wires 1141 is greater than or equal to 50 micrometers.

It may be understood that when ambient light passes through the rear cover 11, the first conducting wire 1141 imposes relatively weak interference and small impact on the ambient light because of a relatively small width and thickness of the first conducting wire 1141 and a relatively small spacing between two first conducting wires 1141. In other words, when the user views the rear cover 11, the first conducting wire 1141 is visually substantially transparent to the user, in other words, the user cannot distinguish the first conducting wire 1141 from the rear cover 11. When a pattern or an identity (Identity, ID) needs to be set on the rear cover 11, the first conducting wire 1141 does not affect presentation of the pattern or the ID, in other words, the first conducting wire 1141 imposes relatively small impact on an appearance surface of the rear cover 11.

In addition, the plurality of first conducting wires 1141 are disposed in the plurality of first grooves 112 in a one-to-one correspondence, and the plurality of second conducting wires 1142 are disposed in a plurality of second grooves 113 in a one-to-one correspondence, to increase a connection area between the baseboard 1113 and each of the first conducting wire 1141 and the second conducting wire 1142, so as to improve connection firmness between the baseboard 1113 and each of the first conducting wire 1141 and the second conducting wire 1142.

In addition, the plurality of first conducting wires 1141 are disposed in the plurality of first grooves 112 in a one-to-one correspondence, and the plurality of second conducting wires 1142 are disposed in the plurality of second grooves 113 in a one-to-one correspondence, to protect the first conducting wire 1141 by using a groove wall of the first groove 112 and protect the second conducting wire 1142 by using a groove wall of the second groove 113. Therefore, when the rear cover 11 is applied to the electronic device 100, a case in which the first conducting wire 1141 and the second conducting wire 1142 are easily damaged due to the fact that the first protective layer 1114 is scratched, and consequently the first line layer 114 cannot send or receive an antenna signal is avoided.

Figure 6:
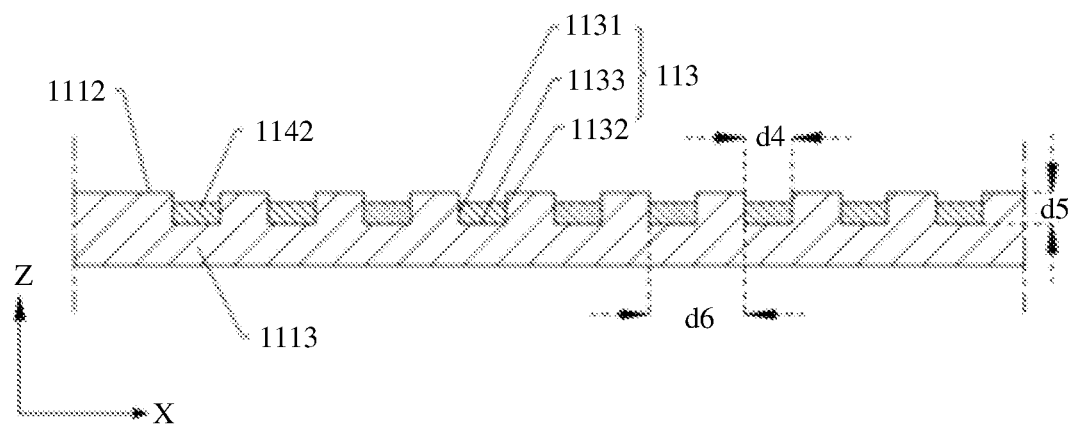
FIG. 6 is a schematic cross-sectional diagram of the rear cover shown in FIG. 4 along C-C.

Referring to FIG. 6, with reference to FIG. 5, FIG. 6 is a schematic cross-sectional diagram of the rear cover shown in FIG. 4 along C-C.

The plurality of second grooves 113 arranged at intervals in the second direction are disposed on the baseboard 1113. An opening of each second groove 113 is located on the second surface 1112. In addition, the plurality of second grooves 113 and the plurality of first grooves 112 are disposed intersecting each other, in other words, the plurality of first grooves 112 and the plurality of second grooves 113 are connected to each other.

In addition, in the second direction, each second grove 113 includes a third groove sidewall 1131 and a fourth groove sidewall 1132 that are disposed opposite to each other. A distance d4 between the third groove sidewall 1131 and the fourth groove sidewall 1132 is less than or equal to 50 micrometers, in other words, a groove width of the second groove 113 is less than or equal to 50 micrometers. In addition, each second groove 113 further includes a second bottom wall 1133. The second bottom wall 1133 is connected between the third groove sidewall 1131 and the fourth groove sidewall 1132. A distance between the second bottom wall 1133 and the second surface 1112 of the baseboard 1113 is less than or equal to 50 micrometers, in other words, a groove depth of the second groove 113 is less than or equal to 50 micrometers. In addition, a distance d6 between third groove sidewalls 1131 of every two second grooves 113 is greater than or equal to 50 micrometers, in other words, a groove distance between every two second grooves 113 is greater than or equal to 50 micrometers.

In addition, the plurality of second conducting wires 1142 are disposed in the plurality of second grooves 113 in a one-to-one correspondence. The second groove 113 may be completely filled with the second conducting wire 1142, or the second groove 113 may be partially filled with the second conducting wire 1142. The first protective layer 1114 covers the second conducting wire 1142.

In addition, when the second conducting wire 1142 is disposed in the second groove 113 of the foregoing size, a width of the second conducting wire 1142 in a width direction of the second groove 113 is less than or equal to 50 micrometers, a thickness of the second conducting wire 1142 in a thickness direction of the second groove 113 is less than or equal to 50 micrometers, and a distance between two adjacent second conducting wires 1142 is greater than or equal to 50 micrometers. In other words, a width of the second conducting wire 1142 in the X direction is less than or equal to 50 micrometers, a thickness of the second conducting wire 1142 in the Z direction is less than or equal to 50 micrometers, and the distance between the two adjacent second conducting wires 1142 is greater than or equal to 50 micrometers.

It may be understood that when ambient light passes through the rear cover 11, the second conducting wire 1142 imposes relatively weak interference and small impact on the ambient light because of a relatively small width and thickness of the second conducting wire 1142 and a relatively small spacing between two second conducting wires 1142. In other words, when the user views the rear cover 11, the second conducting wire 1142 is visually substantially transparent to the user. When a pattern or an identity (Identity, ID) needs to be set on the rear cover 11, the first conducting wire 1141 does not affect presentation of the pattern or the ID, in other words, the second conducting wire 1142 imposes relatively small impact on the appearance surface of the rear cover 11.

It may be understood that when the first conducting wires 1141 intersect the second conducting wires 1142 to form first line layers 114 connected to each other, the first line layer 114 imposes relatively weak interference and small impact on ambient light. In other words, when the user views the rear cover 11, the first line layer 114 is visually substantially transparent to the user. When a pattern or an identity (Identity, ID) needs to be set on the rear cover 11, the first line layer 114 does not affect presentation of the pattern or the ID, in other words, the first line layer 114 imposes relatively small impact on the appearance surface of the rear cover 11.

Furthermore, the first line layer 114 imposes relatively weak interference and small impact on the ambient light, and therefore the first line layer 114 does not affect or interfere with the first protective layer 1114 (for example, when a position of the first protective layer 1114 needs to be set to be transparent, the first line layer 114 does not affect a transparent effect of the first protective layer 1114 at the position).

An implementation of a method for forming the first line layer 114 is described below in detail.

The plurality of first grooves 112 arranged at intervals in the first direction and the plurality of second grooves 113 arranged at intervals in the second direction are formed on the baseboard 1113 through chemical etching. An opening of each of the first groove 112 and the second groove 113 is located on the second surface 1112 of the baseboard 1113. In another implementation, the first groove 112 and the second groove 113 may be formed on the baseboard 1113 through laser engraving by using a laser engraving machine.

Each first groove 112 and each second groove 113 are filled with a conductive material. The conductive material may be but is not limited to silver paste. In this case, the first conducting wire 1141 is formed in the first groove 112, and the second conducting wire 1142 is formed in the second groove 113.

In this implementation, according to the method, the first line layer 114 may be formed on the baseboard 1113, so that the first line layer 114 is used as the radiator 42 of an antenna. It may be understood that for the rear cover 11 formed by using the method, a thickness of the rear cover 11 is not increased, in other words, a thickness of the electronic device 100 is not increased, due to the fact that the first line layer 114 is added, to facilitate thinning setting of the electronic device 100. In addition, the first line layer 114 may be formed in the rear cover body 11, to ensure that the first line layer 114 is not easily damaged.

It may be understood that, that a part of the rear cover 11 forms the radiator 42 is described above in detail. A feeding manner of the radio frequency transceiver circuit 41 and the radiator 42 is described below in detail with reference to related drawings.

Referring to FIG. 5 again, the electronic device 100 further includes a holder 70. The holder 70 is fixedly connected to a side that is of the circuit board 30 and that is away from the screen 20, in other words, the holder 70 is fixedly connected to a side that is of the circuit board 30 and that faces the rear cover body 11. The holder 70 is configured to cover some electronic components on the circuit board 30, to protect the electronic components. For example, the electronic component may be but is not limited to the resistor, the inductor, or the capacitor in the radio frequency transceiver circuit 41, or the electronic component may be a communications chip.

In addition, a second line layer 71 is disposed on the holder 70. It is shown in FIG. 5 that the second line layer 71 is disposed on a surface that is of the holder 70 and that faces the rear cover body 111. In another implementation, the second line layer 71 may be disposed on a surface that is of the holder 70 and that faces the circuit board 30. Alternatively, the second line layer 71 may be partially disposed on a surface that is of the holder 70 and that faces the rear cover body 111, and partially disposed on a side surface of the holder 70.

In addition, the second line layer 71 is electrically connected to the radio frequency transceiver circuit 41, and the second line layer 71 is coupled to the first line layer 114. It may be understood that when the radio frequency transceiver circuit 41 transmits a radio frequency signal, the radio frequency signal is transferred to the second line layer 71. In this case, the radio frequency signal is coupled and fed to the first line layer 114 by using the second line layer 71, and the first line layer 114 radiates an antenna signal to the outside of the electronic device 100. In addition, the first line layer 114 may further receive an antenna signal from the outside of the electronic device 100, and convert the antenna signal into a radio frequency signal. The radio frequency signal is coupled and fed to the second line layer 71 by using the first line layer 114, and is transmitted to the radio frequency transceiver circuit 41 by using the second line layer 71.

In this implementation, the second line layer 71 is disposed on the holder 70, so that a radio frequency signal is fed to the first line layer 114 while integrity of the rear cover 11 is ensured, and accordingly the first line layer 114 radiates an antenna signal. In addition, there is a relatively long distance between the first line layer 114 and the second line layer 71, and therefore there is a relatively large clearance region between the first line layer 114 and the second line layer 71. In this case, the first line layer 114 and the second line layer 71 have better antenna performance.

Referring to FIG. 5 again, the antenna module 40 further includes a spring 43. A shape and a position of the spring 43 are not limited to a shape and a position shown in FIG. 5. The spring 43 is fixedly connected to the circuit board 30, and the spring 43 is electrically connected between the radio frequency transceiver circuit 41 and the second line layer 71. In an implementation, the holder 70 is provided with a through hole 73. The spring 43 comes into contact with the second line layer 71 through the through hole 73. In this case, a radio frequency signal transmitted by the radio frequency transceiver circuit 41 is fed to the second line layer 71 by using the spring 43. In another implementation, the second line layer 71 may be electrically connected to the radio frequency transceiver circuit 41 by using a connector. In this case, a radio frequency signal is fed to the second line layer 71 by using the connector.

In an implementation, the second line layer 71 is formed on a surface that is of the holder 70 and that faces the rear cover 11 through laser direct structuring (laser direct structuring, LDS). A material of the second line layer 71 may be but is not limited to a precious metal material such as gold, silver, copper, aluminum, or platinum, a conductive oxide, or graphene. A shape of the second line layer 71 is not limited to a strip shape shown in FIG. 5. For example, the second line layer 71 may be in an F shape. This is not specifically limited in this application. In addition, in another implementation, the flexible circuit board 30 may be attached to the surface that is of the holder 70 and that faces the rear cover 11. Traces on the flexible circuit board 30 form the second line layer 71 coupled to the first line layer 114.

In an implementation, the second line layer 71 may send and receive an antenna signal. That is, when the second line layer 71 receives a radio frequency signal, the second line layer 71 can radiate an antenna signal based on the radio frequency signal, or the second line layer 71 can receive an antenna signal from the outside of the electronic device 100, and convert the antenna signal into a radio frequency signal. It may be understood that when the second line layer 71 can send and receive an antenna signal, the quantity of antennas in the electronic device 100 is further increased. In this case, the electronic device 100 can cover a wider communication range.

Figure 7:
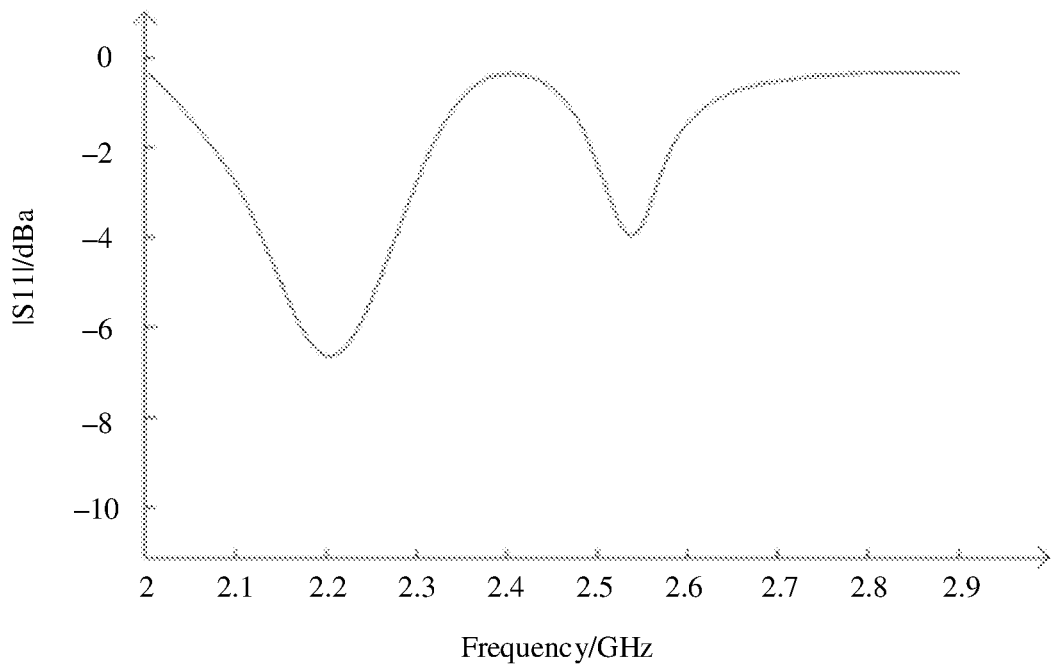
FIG. 7 is a diagram of a relationship between a reflection coefficient and a frequency of the electronic device shown in FIG. 1 at a frequency band that ranges from 2 GHz to 2.9 GHz.

FIG. 7 is a diagram of a relationship between a reflection coefficient and a frequency of the electronic device shown in FIG. 1 at a frequency band that ranges from 2 GHz to 2.9 GHz. When the radio frequency transceiver circuit 41 transmits a radio frequency signal at the frequency band that ranges from 2 GHz to 2.9 GHz, the radio frequency signal is transmitted to the second line layer 71, and is fed to the first line layer 114 by using the second line layer 71. In this case, the second line layer 71 and the first line layer 114 generate two resonant modes at the frequency band, in other words, the second line layer 71 and the first line layer 114 can generate two resonant frequencies at the frequency band. It is shown in FIG. 7 that the two resonant frequencies generated by the second line layer 71 and the first line layer 114 are respectively at 2.19 GHz and 2.53 GHz. It may be learned through verification that a first resonant frequency is a resonant frequency generated by the first line layer 114, and a second resonant frequency is a resonant frequency generated by the second line layer 71.

It may be understood that the second line layer 71 and the first line layer 114 can generate two resonant frequencies at the frequency band, and therefore when a staff member sets an operating frequency band of the antenna module 40, a range of the operating frequency band of the antenna module 40 is relatively wide. In other words, the staff member can set frequency bands to which resonant frequencies in the two resonant modes belong as operating frequency bands of the antenna. For example, the operating frequency bands are 2.1 GHz to 2.3 GHz and 2.4 GHz to 2.7 GHz. Therefore, the electronic device 100 in this implementation has a wider operating frequency band than an electronic device that generates one resonant mode.

In addition, the resonant frequency generated by the first line layer 114 varies with a quantity of first conducting wires 1141, a quantity of second conducting wires 1142, a length of the first conducting wire 1141, the width of the first conducting wire 1141, the thickness of the first conducting wire 1141, a length of the second conducting wire 1142, the width of the second conducting wire 1142, and the thickness of the second conducting wire 1142. For example, when a total length of the first conducting wire 1141 and the second conducting wire 1142 is 10 millimeters, the resonant frequency generated by the first line layer 114 is 1 GHz. When the total length of the first conducting wire 1141 and the second conducting wire 1142 is 8 millimeters, the resonant frequency generated by the first line layer 114 is 2 GHz.

Figure 8:
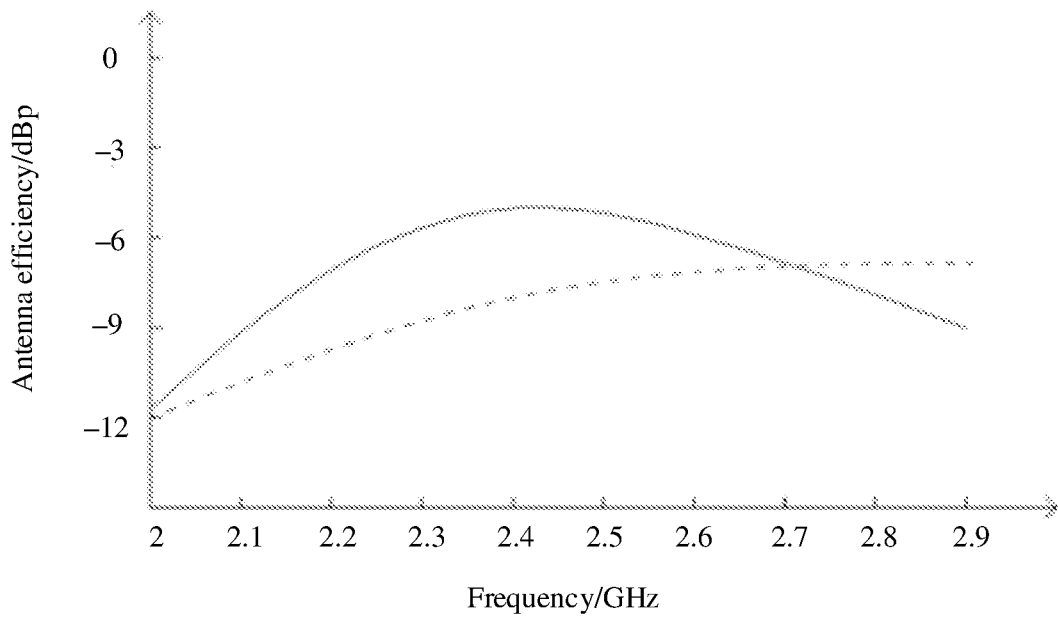
FIG. 8 is a schematic diagram of antenna efficiency of the electronic device shown in FIG. 1 at a frequency band that ranges from 2 GHz to 2.9 GHz.

FIG. 8 is a schematic diagram of antenna efficiency of the electronic device shown in FIG. 1 at a frequency band that ranges from 2 GHz to 2.9 GHz. A dashed line in FIG. 8 represents a curve of antenna efficiency that exists at the frequency band ranging from 2 GHz to 2.9 GHz and that corresponds to the electronic device in which the first line layer 114 is not disposed but the second line layer 71 is disposed. Based on the curve, it may be found that the antenna efficiency of the electronic device at a frequency near 2.4 GHz is −8 dB. Clearly, the electronic device in which the first line layer 114 is not disposed but the second line layer 71 is disposed has relatively low antenna efficiency at the frequency near 2.4 Hz. In addition, a solid line in FIG. 8 represents a curve of antenna efficiency that exists at the frequency band ranging from 2 GHz to 2.9 GHz and that corresponds to the electronic device in which the first line layer 114 and the second line layer 71 are disposed. Based on the curve, it may be found that the antenna efficiency of the electronic device at a frequency near 2.4 GHz is −5 dB. Clearly, there is an improvement of approximately 1 dB to 3 dB to the antenna efficiency of the electronic device in which the first line layer 114 and the second line layer 71 are disposed. Therefore, the electronic device in which the first line layer 114 and the second line layer 71 are disposed corresponds to better antenna efficiency at the frequency band that ranges from 2 GHz to 2.9 GHz.

In another implementation, a spring is fixedly connected to the circuit board 30. The spring is electrically connected to the radio frequency transceiver circuit 41. The spring is coupled to the first line layer 114. In this case, when the radio frequency transceiver circuit 41 transmits a radio frequency signal, the radio frequency signal is transferred to the spring. In this case, the radio frequency signal is coupled and fed to the first line layer 114 by using the spring, and the first line layer 114 radiates an antenna signal to the outside of the electronic device 100. In addition, the first line layer 114 may further receive an antenna signal from the outside of the electronic device 100, and convert the antenna signal into a radio frequency signal. The radio frequency signal is coupled and fed to the spring by using the first line layer 114, and is transmitted to the radio frequency transceiver circuit 41 by using the spring.

In an implementation, the spring may be further configured to send and receive an antenna signal. In this case, the quantity of antennas in the electronic device 100 is further increased, and the electronic device 100 can cover a wider communication range.

Figure 9:
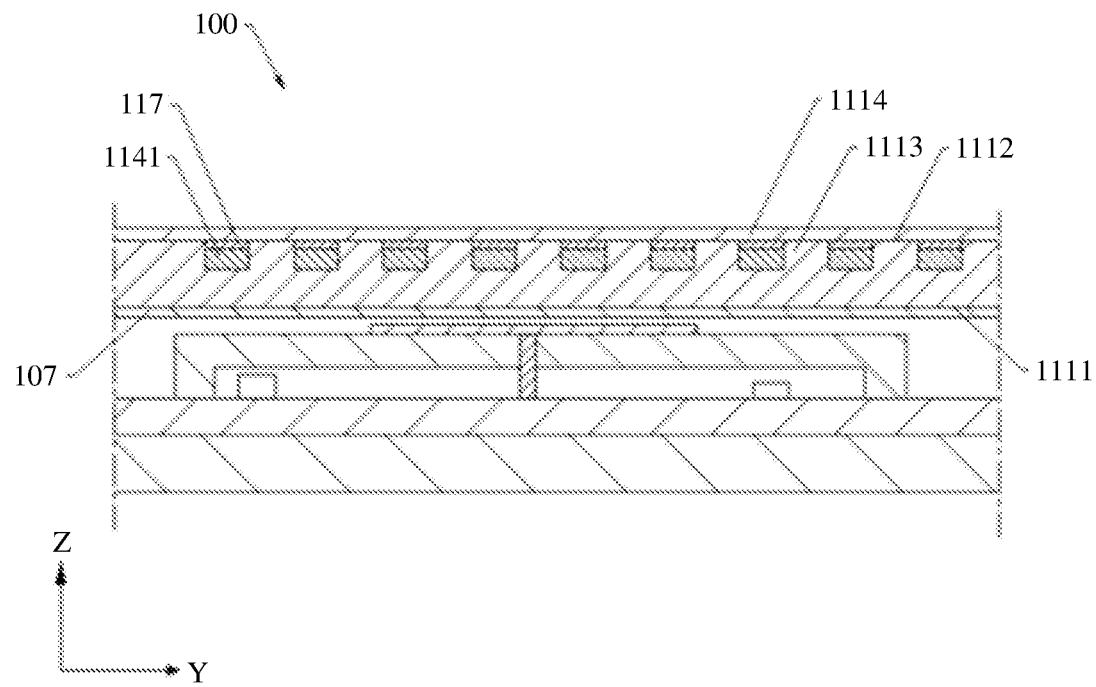
FIG. 9 is a schematic cross-sectional diagram of another implementation of the electronic device shown in FIG. 1 along a line B-B.

FIG. 9 is a schematic cross-sectional diagram of another implementation of the electronic device shown in FIG. 1 along a line B-B. The cover 11 further includes a first ink layer 107 and a second ink layer 117. The first ink layer 107 is disposed on a first surface 1111 of the baseboard 1113, and is located on one side of the first line layer 114. The second ink layer 117 is completely built into the rear cover body 11, and is stacked on a surface that is of the first line layer 114 and that is away from the first ink layer 107. In this implementation, the second ink layer 117 is disposed in a first groove 112 and a second groove 113, and the second ink layer 117 covers the first conducting wire 1141 and the second conducting wire 1142.

In addition, a color of the second ink layer 117 and a color of the first ink layer 107 belong to a same color system. That a color of the second ink layer 117 and a color of the first ink layer 107 belong to a same color system means that the colors are the same, but the colors differ in gradation. For example, the second ink layer 117 is in a color of pink, and the first ink layer 107 is in a color of deep red. Certainly, the color of the second ink layer 117 may be the same as the color of the first ink layer 107.

It may be understood that the first ink layer 107 is disposed on the first surface 1111, so that overall strength of the cover 11 can be improved and it can be ensured that the cover 11 has a relatively good appearance (for example, the first ink layer 107 may change a color of the surface of the cover 11, to meet a requirement of the user for a color). In addition, the second ink layer 117 is stacked on the surface that is of the first line layer 114 and that is away from the first ink layer 107, and the color of the second ink layer 117 and the color of the first ink layer 107 belong to the same color system, so that the first line layer is hidden in the rear cover body 111 by using the second ink layer 117, to ensure that the first line layer 114 does not affect or interfere with a display effect of the second ink layer 117.

Figure 10A:
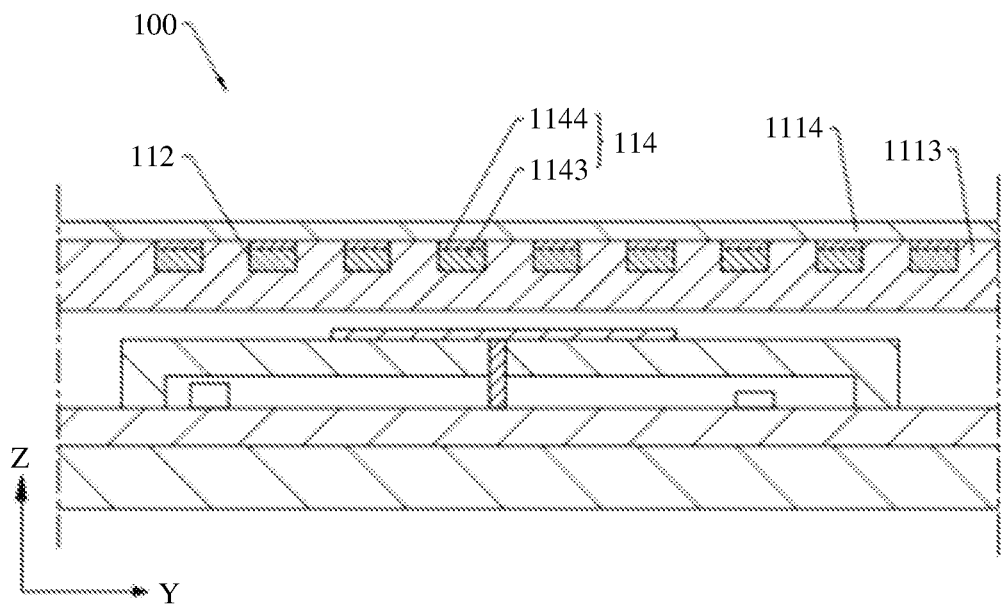
FIG. 10a is a schematic cross-sectional diagram of still another implementation of the electronic device shown in FIG. 1 along a line B-B.

FIG. 10*a* is a schematic cross-sectional diagram of another implementation of the electronic device shown in FIG. 1 along a line B-B. The first line layer 114 includes a first sublayer 1143 and a second sublayer 1144 that are stacked. It is shown in FIG. 10*a* that the first line layer 114 is disposed only in a first groove 112. A case in which the first line layer 114 is disposed in a second groove 113 is the same as the case in which the first line layer 114 is disposed in the first groove 112, and therefore no additional drawings are provided herein. Resistivity of the second sublayer 1144 is less than resistivity of the first sublayer 1143. For example, when the first sublayer 1143 is made of silver, the second sublayer 1144 may be made of gold or copper. It may be understood that the resistivity of the second sublayer 1144 is less than the resistivity of the first sublayer 1143, and therefore overall resistivity of the first line layer 114 is significantly reduced. When overall impedance of the first line layer 114 is significantly reduced, the first line layer 114 has relatively high performance of sending and receiving an antenna signal. In another implementation, a first ink layer 107 may be further disposed on a first surface 1111 of the baseboard 1113. In addition, a second ink layer 117 is disposed on a surface that is of the second sublayer 1144 and that is away from the first sublayer 1143.

Figure 10B:
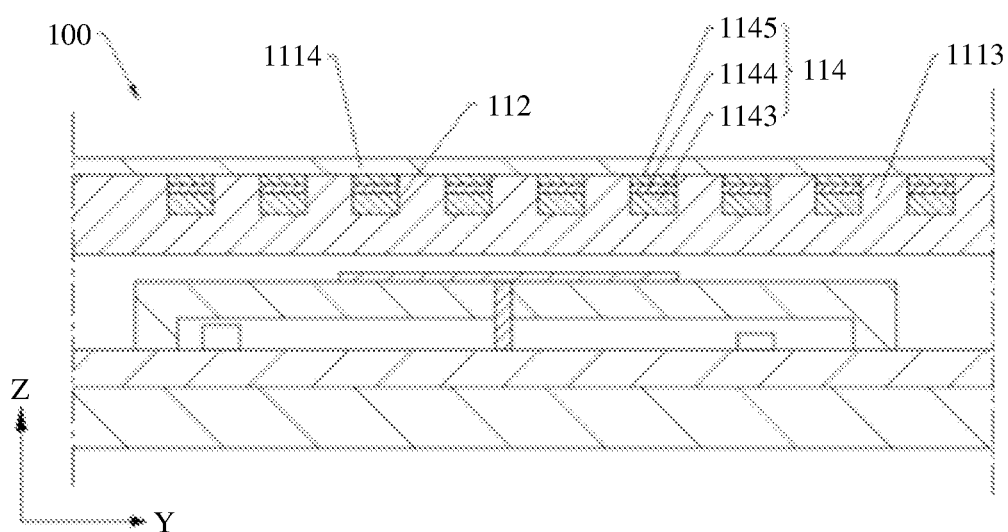
FIG. 10b is a schematic cross-sectional diagram of still another implementation of the electronic device shown in FIG. 1 along a line B-B.

FIG. 10*b* is a schematic cross-sectional diagram of still another implementation of the electronic device shown in FIG. 1 along a line B-B. The first line layer 114 further includes a third sublayer 1145. The third sublayer 1145 is disposed on a surface that is of a second sublayer 1144 and that is away from a first sublayer 1143. It is shown in FIG. 10*b* that the first line layer 114 is disposed only in a first groove 112. A case in which the first line layer 114 is disposed in a second groove 113 is the same as the case in which the first line layer 114 is disposed in the first groove 112, and therefore no additional drawings are provided herein. Oxidation resistance of the third sublayer 1145 is higher than oxidation resistance of the second sublayer 1144. For example, when the second sublayer 1144 is made of copper, the third sublayer 1145 may be made of nickel. It may be understood that when the third sublayer 1145 covers the second sublayer 1144, the third sublayer 1145 may prevent the second sublayer 1144 from being oxidized, to ensure that overall impedance of the first line layer 114 is not significantly increased due to an increase in impedance of the second sublayer 1144, so as to ensure that the performance of sending and receiving an antenna signal by the first line layer 114 is not significantly degraded. In addition, the third sublayer 1145 is not easily oxidized, and therefore impedance of the third sublayer 1145 is not significantly increased, to ensure that the performance of sending and receiving an antenna signal by the first line layer 114 is not significantly degraded. In another implementation, a first ink layer 107 may be further disposed on a first surface 1111 of the baseboard 1113. In addition, a second ink layer 117 is disposed on a surface that is of the third sublayer 1145 and that is away from the second sublayer 1144.

In an implementation, the first protective layer 1114 includes a plating layer. The plating layer is formed through physical vapour deposition (physical vapour deposition, PVD). Physical vapour deposition includes a process such as vacuum evaporation, magnetron sputtering, or plasma ion plating (hollow cathode ion plating, hot cathode ion plating, are ion plating, reactive ion plating, radio frequency ion plating, or direct current discharge ion plating). It may be understood that the plating layer formed by using the PVD process has a relatively uniform thickness, and the plating layer has a relatively high capability of bonding to the baseboard 1113. In this case, the plating layer can effectively protect the first line layer 114 from being easily damaged.

In an implementation, the first protective layer 1114 includes a coating layer. For example, the second surface 1112 is coated with ceramic powder, to form a ceramic layer. In this case, the ceramic layer has relatively high hardness, and therefore the ceramic layer can effectively protect the first line layer 114 from being easily damaged.

In an implementation, the first protective layer 1114 further includes a hardened layer. Specifically, the second surface 1112 is coated with hardening liquid through spray coating, flow coating, or dip coating, to form the hardened layer. The hardening fluid may be but is not limited to silica gel. It may be understood that the hardened layer has relatively high hardness, and therefore the hardened layer can effectively protect the first line layer 114.

In an implementation, the first protective layer 1114 may be a protective film. Specifically, the protective film is bonded to the second surface 1112. In this case, the protective film can effectively protect the first line layer 114.

In an implementation, the first protective layer 1114 includes at least two of a plating layer, a coating layer, and a protective film. In this case, the first protective layer 1114 has higher hardness, and a better effect is achieved when the first protective layer 1114 protects the first line layer 114.

Figure 11:
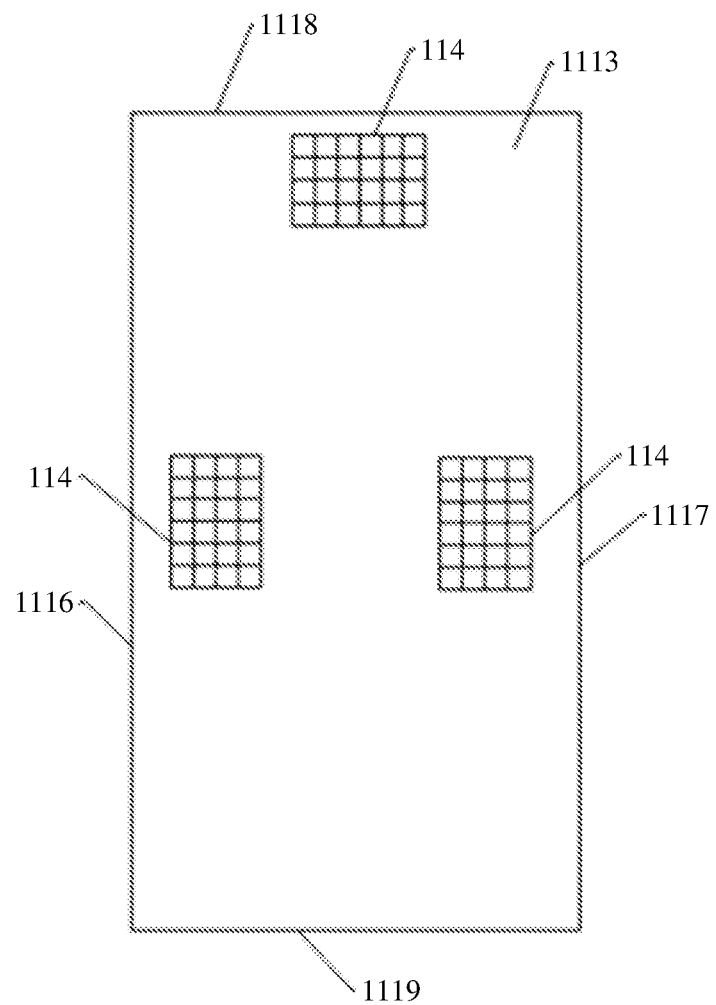
FIG. 11 is a schematic diagram of a partial structure of another implementation of a rear cover according to an embodiment of this application.

FIG. 11 is a schematic diagram of a partial structure of another implementation of the rear cover according to an embodiment of this application. There are a plurality of first line layers 114. The plurality of first line layers 114 are built into different positions in the rear cover body 11, in other words, the plurality of first line layers 114 are located at different positions on the baseboard 1113. In this case, when the user uses the electronic device 100, a hand of the user does not simultaneously cover the plurality of first line layers 114, to ensure that the hand of the user does not simultaneously interfere with or affect sending or receiving of an antenna signal by the plurality of first line layers 114.

In addition, the baseboard 1113 includes a first long edge 1116 and a second long edge 1117 that are disposed opposite to each other and a first short edge 1118 and a second short edge 1119 that are disposed opposite to each other. The first short edge 1118 and the second short edge 1119 are connected between the first long edge 1116 and the second long edge 1117. At least one first line layer 114 is disposed close to the first long edge 1116. At least one first line layer 114 is disposed close to the second long edge 1117. At least one first line layer 114 is disposed close to the first short edge 1118. It may be understood that when the user uses the electronic device 100 in a landscape mode (for example, plays a game or watches a video), the hand of the user does not interfere with the first line layer 114 disposed close to the first long edge 1116 and the second line layer 71 disposed close to the second long edge 1117. When the user uses the electronic device 100 in a portrait mode (for example, replies to information or browses a page), the hand of the user does not interfere with the first line layer 114 disposed close to the first long edge 1116 and the first line layer 114 disposed close to the first short edge 1118.

Figure 12:
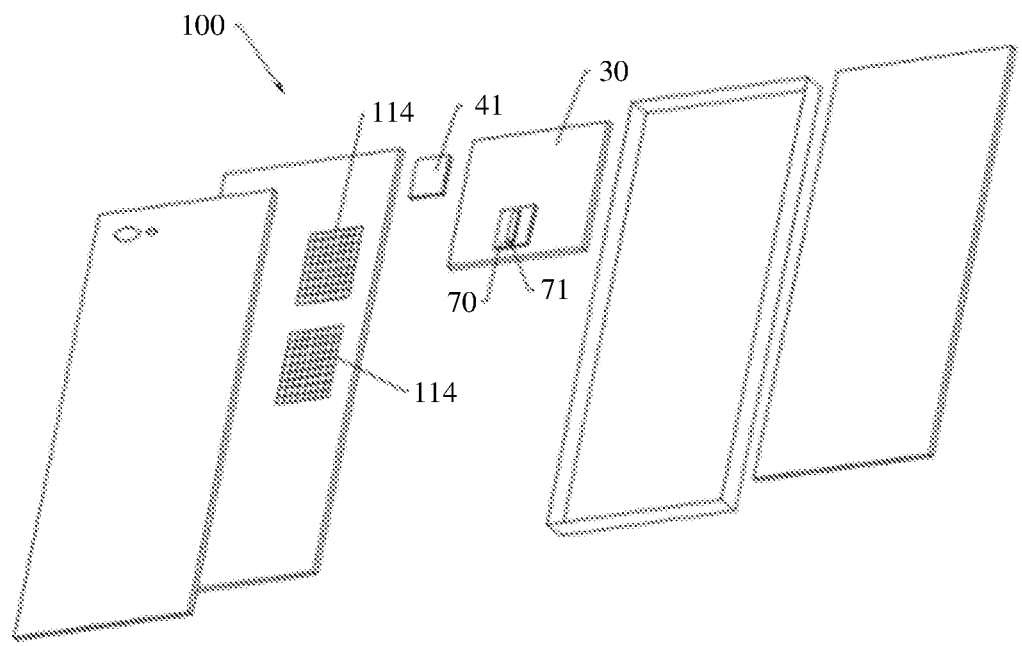
FIG. 12 is an exploded schematic diagram of another implementation of an electronic device according to an embodiment of this application.

FIG. 12 is an exploded schematic diagram of another implementation of the electronic device according to an embodiment of this application. One second line layer 71 is disposed on the holder 70. The one second line layer 71 is coupled to the plurality of first line layers 114. In this case, when a radio frequency signal transmitted by the radio frequency transceiver circuit 41 is transmitted to the second line layer 71, the radio frequency signal can be simultaneously coupled and fed to the plurality of first line layers 114 by using the second line layer 71. In this case, the plurality of first line layers 114 can radiate an antenna signal to the outside of the electronic device 100.

It may be understood that the one second line layer 71 is used to simultaneously couple and feed a radio frequency signal to the plurality of first line layers 114, to improve utilization of the second line layer 71.

In another implementation, there may be a plurality of second line layers 71. The plurality of second line layers 71 are in a one-to-one correspondence with the plurality of first line layers 114, and one second line layer 71 is coupled to one first line layer 114. In this case, there are a relatively large quantity of radiators, and the electronic device 100 can cover a wider communication range.

Figure 13:
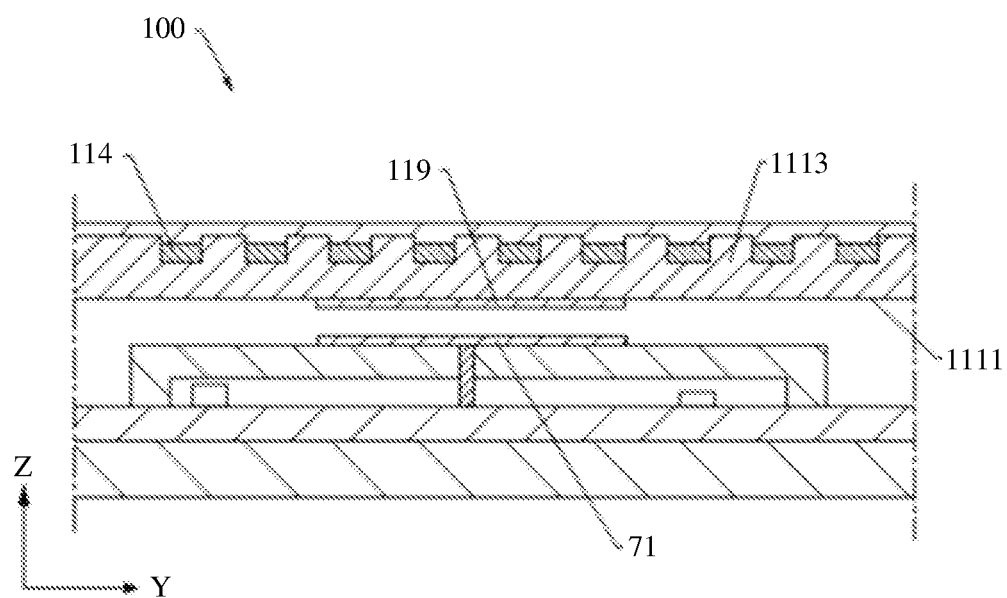
FIG. 13 is a schematic cross-sectional diagram of still another implementation of the electronic device shown in FIG. 1 along a line B-B.

FIG. 13 is a schematic cross-sectional diagram of still another implementation of the electronic device shown in FIG. 1 along a line B-B. A third line layer 119 is disposed on a first surface 1111 of the baseboard 1113. The third line layer 119 is coupled to the first line layer 114 and the second line layer 71. In this case, when a radio frequency signal is transmitted to the second line layer 71, the radio frequency signal can be coupled and fed to the third line layer 119 by using the second line layer 71. In this case, the radio frequency signal is then coupled and fed to the first line layer 114 by using the third line layer 119. The second line layer 71, the third line layer 119, and the first line layer 114 radiate an antenna signal to the outside of the electronic device 100. A same operation is performed, that is, the first line layer 114 converts a received antenna signal into a radio frequency signal, and sequentially couples and feeds the radio frequency signal to the radio frequency transceiver circuit 41 by using the third line layer 119 and the second line layer 71.

It may be understood that the third line layer 119 is disposed on the first surface 1111 of the baseboard 1113, to increase a quantity of radiators, so that the electronic device 100 can cover a wider communication range. In addition, space in which the first surface 1111 of the baseboard 1113 is located is fully utilized, and therefore space utilization of the electronic device 100 is significantly improved.

In an implementation, the third line layer 119 is formed on the first surface 1111 of the baseboard 1113 through LDS. The third line layer 119 may be but is not limited to a precious metal material such as gold, silver, copper, aluminum, or platinum, a conductive oxide, or graphene. In another implementation, the flexible circuit board 30 may be attached to the first surface 1111 of the baseboard 1113. Traces on the flexible circuit board 30 may be used to form the third line layer 119. In another implementation, the third line layer 119 may be printed on the first surface 1111 of the baseboard 1113. This is not specifically limited in this application. A shape of the third line layer 119 is not limited to a strip shape shown in FIG. 13.

In another implementation, when a first ink layer 107 is disposed on the first surface 1111 of the baseboard 1113, the third line layer 119 may be disposed on a surface that is of the first ink layer 107 and that is away from the first surface 1111. In addition, a second ink layer 117 may be further disposed on a surface that is of the first line layer 114 and that is away from the first ink layer 107.

Figure 14:
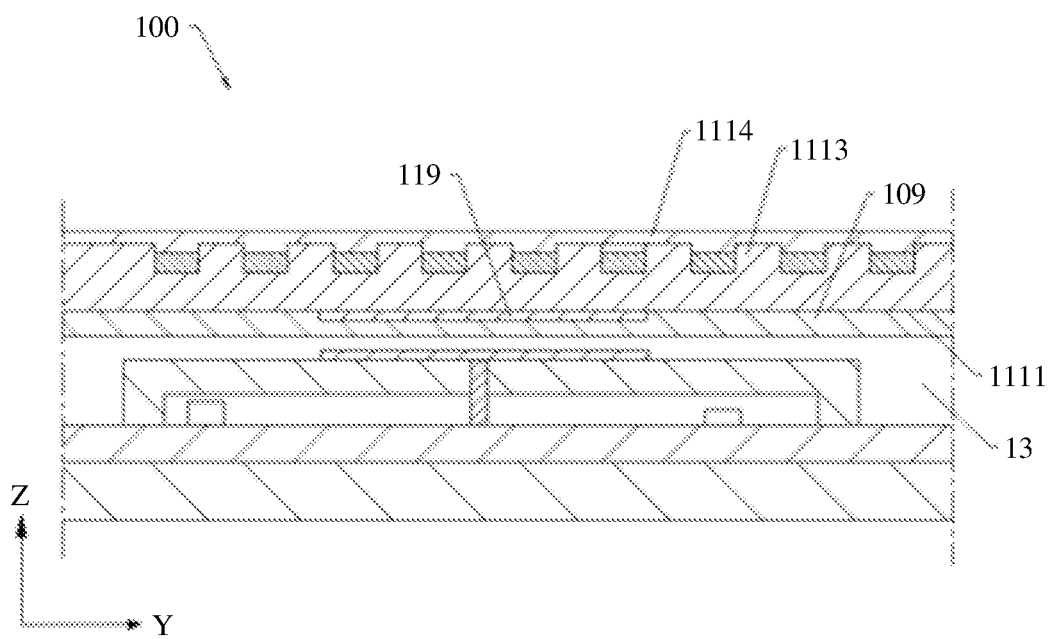
FIG. 14 is a schematic cross-sectional diagram of still another implementation of the electronic device shown in FIG. 1 along a line B-B.

FIG. 14 is a schematic cross-sectional diagram of still another implementation of the electronic device shown in FIG. 1 along a line B-B. The rear cover body 11 further includes a second protective layer 109. The second protective layer 109 is disposed on a surface that is of the baseboard 1113 and that is away from the first protective layer 1114, in other words, the second protective layer 109 is disposed on a first surface 1111 of the baseboard 1113. The second protective layer 109 covers the third line layer 119. It may be understood that a material of the second protective layer 109 may be but is not limited to glass, PMMA, PI, PET, or ceramic. In this case, the second protective layer 109 may be used to protect the third line layer 119, to avoid a case in which the third line layer 119 comes into contact with the electronic component in the accommodation space 13 and is damaged.

In another implementation, a first ink layer 107 is disposed on a surface that is of the second protective layer 109 and that is away from the baseboard 1113. In addition, a second ink layer 117 may be further disposed on a surface that is of the first line layer 114 and that is away from the first ink layer 107.

Figure 15A:
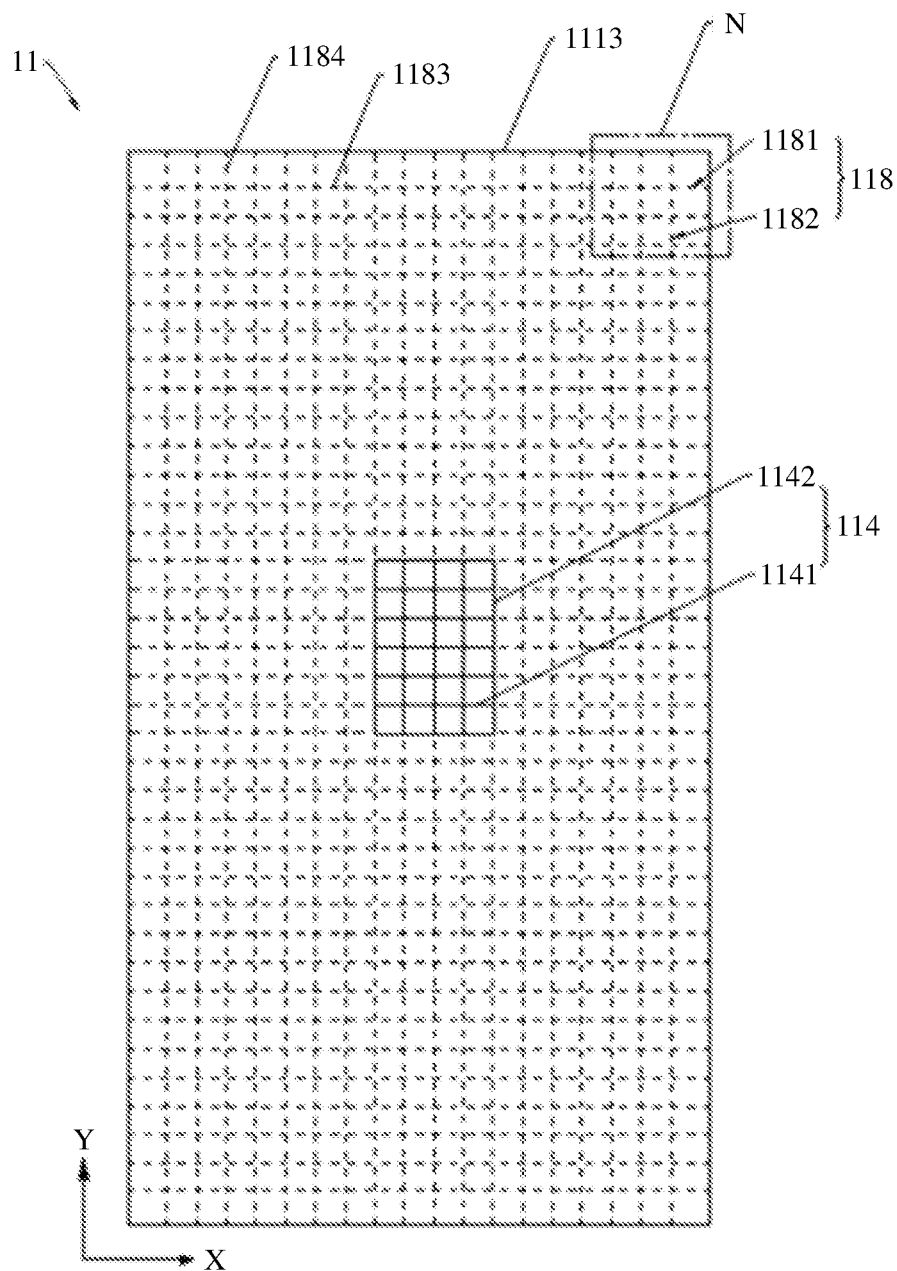
FIG. 15a is a schematic diagram of a partial structure of still another implementation of a rear cover according to an embodiment of this application.

FIG. 15a is a schematic diagram of a partial structure of still another implementation of the rear cover according to an embodiment of this application.

The rear cover 11 further includes a pattern layer 118. The pattern layer 118 is completely built into the rear cover body 11, and is disposed at a same layer as the first line layer 114. The pattern layer 118 includes a plurality of first traces 1181 and a plurality of second traces 1182. The plurality of first traces 1181 are arranged at intervals in the first direction. The plurality of second traces 1182 are arranged at intervals in the second direction. Some of the plurality of first traces 1181 are arranged in alignment with the plurality of first conducting wires 1141 in a one-to-one correspondence, and some of the plurality of second traces 1182 are arranged in alignment with the plurality of second conducting wires 1142 in a one-to-one correspondence.

In this implementation, the pattern layer 118 is built into the rear cover body 11, some first traces 1181 are arranged in alignment with the plurality of first conducting wires 1141 in a one-to-one correspondence, and some second traces 1182 are arranged in alignment with the plurality of second conducting wires 1142 in a one-to-one correspondence, so that the first line layer 114 is hidden in the pattern layer 118, to implement relatively high appearance consistency for the rear cover 11. In other words, when the user views the rear cover 11, the user views a substantially same situation at all positions on the rear cover 11, in other words, the first conducting wire 1141 and the second conducting wire 1142 impose relatively small impact on an appearance of the rear cover 11.

In addition, each of the first trace 1181 and the second trace 1182 uses a conductive material, the first trace 1181 includes a plurality of first trace segments 1183 disposed at intervals, and the second trace 1182 includes a plurality of second trace segments 1184 disposed at intervals. The plurality of first trace segments 1183 are disconnected from each other, and the plurality of second trace segments 1184 are disconnected from each other. In other words, the first trace 1181 and the second trace 1182 cannot form a continuous line layer. In this case, when a radio frequency signal is coupled and fed to the pattern layer 118, the plurality of first trace segments 1183 and the plurality of second trace segments 1184 cannot radiate an antenna signal. Therefore, the pattern layer 118 imposes relatively small impact and weak interference on sending and receiving of an antenna signal by the first line layer 114.

In another implementation, each of the first trace 1181 and the second trace 1182 uses an insulating material. In this case, the first trace 1181 and the second trace 1182 cannot radiate an antenna signal. Therefore, the pattern layer 118 imposes no impact or interference on sending and receiving of an antenna signal by the first line layer 114. In this implementation, shapes of the first trace 1181 and the second trace 1182 are not limited. It may be understood that the first trace 1181 and the second trace 1182 may be disposed in a strip shape, or may be disposed in a shape of a line segment. This is not specifically limited in this application.

In an implementation, a width of each of the first trace 1181 and the second trace 1182 in the Y direction is less than or equal to 50 micrometers, a thickness of each of the first trace 1181 and the second trace 1182 in the Z direction is less than or equal to 50 micrometers, a distance between two adjacent first traces 1181 is greater than or equal to 50 micrometers, and a distance between two adjacent second traces 1182 is greater than or equal to 50 micrometers.

It may be understood that when the first trace 1181 and the second trace 1182 are of a relatively small size, the first trace 1181 and the second trace 1182 impose relatively weak interference and small impact on ambient light. In other words, when the user views the rear cover 11, the first trace 1181 and the second trace 1182 are visually substantially transparent to the user. When a pattern or an identity (Identity, ID) needs to be set on the rear cover 11, the first trace 1181 and the second trace 1182 do not affect presentation of the pattern or the ID, in other words, the first line layer 114 imposes relatively small impact on an appearance surface of the rear cover 11.

In this implementation, for a manner of forming the first trace 1181 and the second trace 1182, refer to the manner of forming the first conducting wire 1141 and the second conducting wire 1142. Details are not described herein again.

Figure 15B:
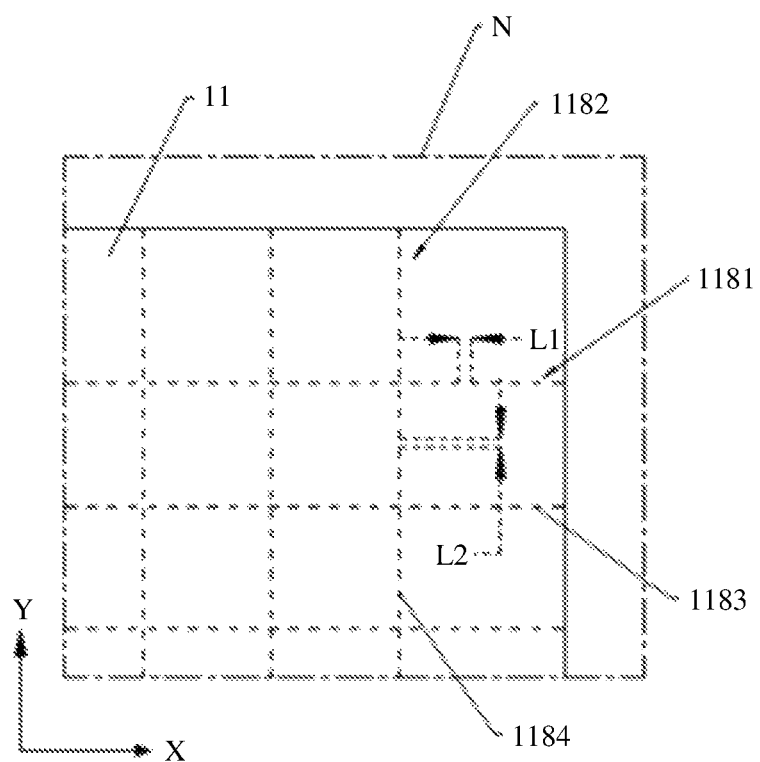
FIG. 15b is an enlarged schematic diagram of the rear cover in FIG. 15a at a position N.

FIG. 15b is an enlarged schematic diagram of the rear cover in FIG. 15a at a position N. A spacing distance L1 between every two first trace segments 1183 ranges from 1 micrometer to 20 micrometers. In this case, it can be ensured that every two first trace segments 1183 are disconnected from each other, and the first trace 1181 cannot form a continuous line layer. In this case, when a radio frequency signal is coupled and fed to the pattern layer 118, the plurality of first trace segments 1183 cannot radiate an antenna signal. Therefore, the first trace 1181 imposes relatively small impact and weak interference on sending and receiving of an antenna signal by the first line layer. In addition, when the user views the rear cover 11, the plurality of first trace segments 1183 can better and effectively hide the first line layer 114 in a visual effect.

Referring to FIG. 15b again, a spacing distance L2 between every two second trace segments 1184 ranges from 1 micrometer to 20 micrometers. In this case, it can be ensured that every two second trace segments 1184 are disconnected from each other, and the second trace 1182 cannot form a continuous line layer. In this case, when a radio frequency signal is coupled and fed to the pattern layer 118, the plurality of second trace segments 1184 cannot radiate an antenna signal. Therefore, the second trace 1182 imposes relatively small impact and weak interference on sending and receiving of an antenna signal by the first line layer 114. In addition, when the user views the rear cover 11, the plurality of second trace segments 1184 can better and effectively hide the first line layer 114 in a visual effect.

The first implementation in which the first line layer 114 is completely built into the rear cover body 11 is described above in detail. A second implementation in which the first line layer 114 is completely built into the rear cover body 11 is described below in detail with reference to related drawings.

Figure 16:
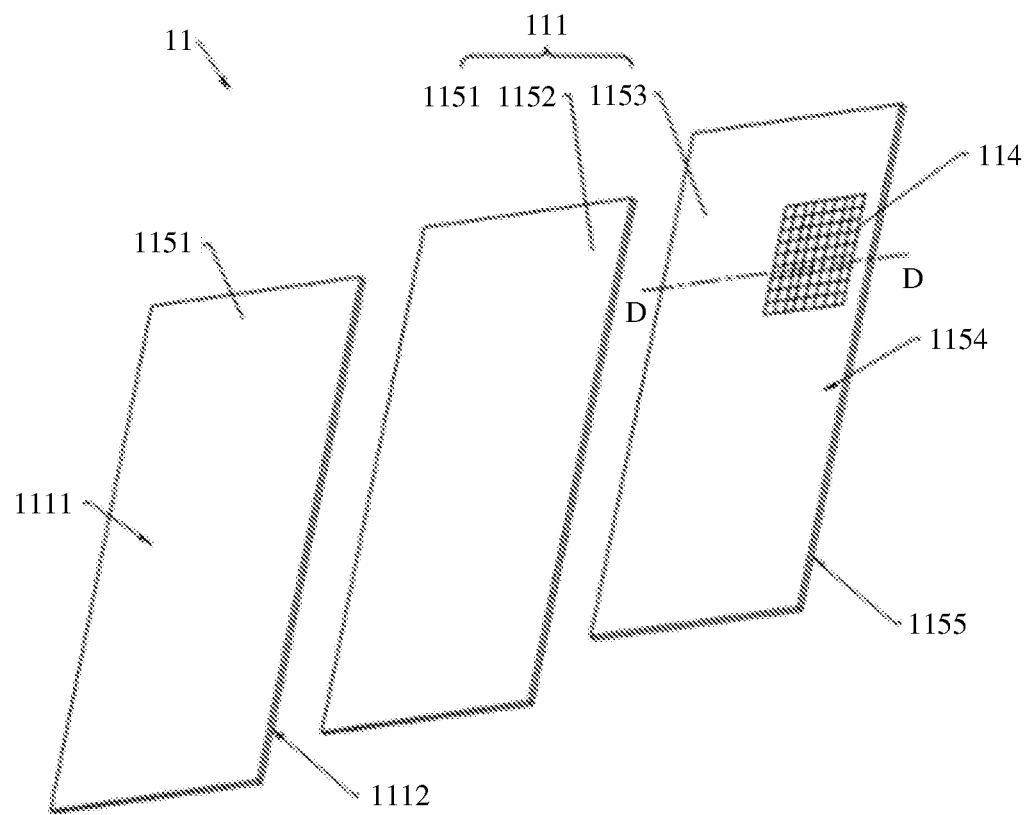
FIG. 16 is an exploded schematic diagram of another implementation of a rear cover shown in FIG. 2.

Technical content, in the second implementation, that is the same as that in the first implementation is not described. FIG. 16 is an exploded schematic diagram of another implementation of the rear cover shown in FIG. 2.

The rear cover body 111 includes a baseboard 1151, a first adhesive layer 1152, and a first base 1153. The first adhesive layer 1152 is connected between the baseboard 1151 and the first base 1153. The first line layer 114 is located between the first adhesive layer 1152 and the first base 1153, and the first line layer 114 is surrounded by the first adhesive layer 1152 and the first base 1153.

In this implementation, the baseboard 1151 is made of a same material as the baseboard 1113 in the first implementation. Details are not described herein again. In addition, a material of the first base 1153 may be but is not limited to a polymer colloid. The first adhesive layer 1152 may be but is not limited to optical clear adhesive.

Figure 17:
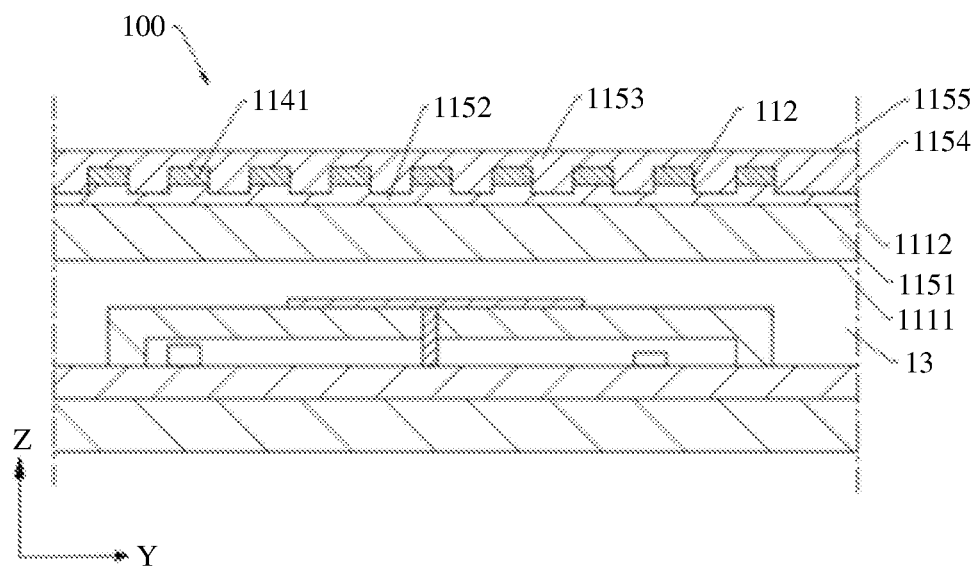
FIG. 17 is a schematic cross-sectional diagram of still another implementation of the electronic device shown in FIG. 1 along a line B-B.

Referring to FIG. 16 and FIG. 17, FIG. 17 is a schematic cross-sectional diagram of still another implementation of the electronic device shown in FIG. 1 along a line B-B. The baseboard 1151 includes a first surface 1111 and a second surface 1112 disposed opposite to each other. The first surface 1111 faces the accommodation space 13. The second surface 1112 is away from the accommodation space 13. The first base 1153 includes a first surface 1154 and a second surface 1155 that are disposed opposite to each other. The first surface 1154 faces the second surface 1112. The second surface 1155 is away from the second surface 1112. A side surface of the first adhesive layer 1152 is connected to the second surface 1112, and another side surface is connected to the first surface 1154.

In this implementation, the first line layer 114 is disposed between the first adhesive layer 1152 and the first base 1153, and the first line layer 114 and the first base 1153 are fastened on the baseboard 1151 by using the first adhesive layer 1152, so that the first line layer 114 is effectively protected by using the first adhesive layer 1152, the first base 1153, and the baseboard 1151, to prevent a user from scratching or damaging the first line layer 114 when using the electronic device 100.

Figure 18:
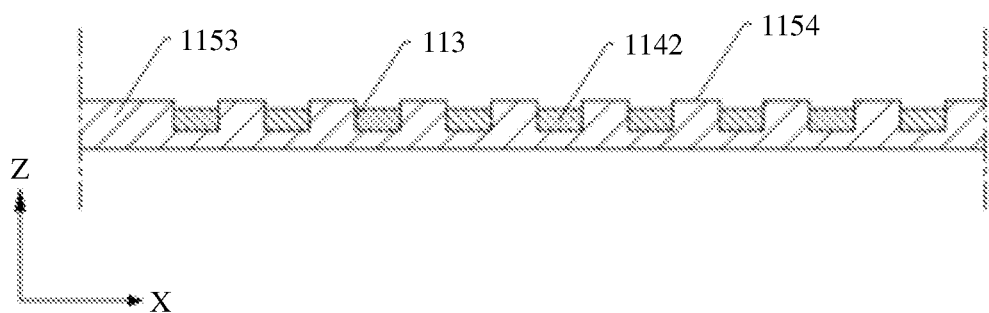
FIG. 18 is a schematic cross-sectional diagram of the rear cover shown in FIG. 16 along a line D-D.

Referring to FIG. 17 and FIG. 18, FIG. 18 is a schematic cross-sectional diagram of the rear cover shown in FIG. 16 along a line D-D. A plurality of first grooves 112 arranged at intervals in the first direction and a plurality of second grooves 113 arranged at intervals in the second direction are disposed at the first base 1153. The plurality of first grooves 112 and the plurality of second grooves 113 are arranged intersecting each other, and the plurality of first grooves 112 and the plurality of second grooves 113 are connected to each other. An opening of each of the first groove 112 and the second groove 113 is located on the first surface 1154. The first groove 112 and the second groove 113 in this implementation have a same size as the first groove 112 and the second groove 113 in the first implementation. Details are not described herein again.

In addition, the plurality of first conducting wires 1141 are disposed in the plurality of first grooves 112 in a one-to-one correspondence. The first groove 112 may be completely filled with the first conducting wire 1141, or the first groove 112 may be partially filled with the first conducting wire 1141. In this case, a width of the first conducting wire 1141 in the Y direction is less than or equal to 50 micrometers, a thickness of the first conducting wire 1141 in a Z direction is less than or equal to 50 micrometers, and a distance between two adjacent first conducting wires 1141 is greater than or equal to 50 micrometers.

In addition, the plurality of second conducting wires 1142 are disposed in the plurality of second grooves 113 in a one-to-one correspondence. The second groove 113 may be completely filled with the second conducting wire 1142, or the second groove 113 may be partially filled with the second conducting wire 1142. In this case, a width of the second conducting wire 1142 in the X direction is less than or equal to 50 micrometers, a thickness of the second conducting wire 1142 in the Z direction is less than or equal to 50 micrometers, and a distance between two adjacent second conducting wires 1142 is greater than or equal to 50 micrometers.

It may be understood that when the first conducting wires 1141 intersect the second conducting wires 1142 to form first line layers 114 connected to each other, the first line layer 114 imposes relatively weak interference and small impact on ambient light. In other words, when the user views the rear cover 11, the first line layer 114 is visually substantially transparent to the user. When a pattern or an identity (Identity, ID) needs to be set on the rear cover 11, the first line layer 114 does not affect presentation of the pattern or the ID, in other words, the first line layer 114 imposes relatively small impact on the appearance surface of the rear cover 11.

In this implementation, the plurality of first conducting wires 1141 are disposed in the plurality of first grooves 112 in a one-to-one correspondence, and the plurality of second conducting wires 1142 are disposed in the plurality of second grooves 113 in a one-to-one correspondence, to increase a connection area between the first base 1153 and each of the first conducting wire 1141 and the second conducting wire 1142, so as to improve connection firmness between the first base 1153 and each of the first conducting wire 1141 and the second conducting wire 1142.

In addition, the plurality of first conducting wires 1141 are disposed in the plurality of first grooves 112 in a one-to-one correspondence, and the plurality of second conducting wires 1142 are disposed in the plurality of second grooves 113 in a one-to-one correspondence, to protect the first conducting wire 1141 by using a groove wall of the first groove 112 and protect the second conducting wire 1142 by using a groove wall of the second groove 113. Therefore, when the cover is applied to the electronic device, a case in which the first conducting wire 1141 and the second conducting wire 1142 are easily damaged due to the fact that the first base 1153 is scratched, and consequently the first line layer 114 cannot send or receive an antenna signal is avoided.

Furthermore, the plurality of first conducting wires 1141 and the plurality of second conducting wires 1142 are located at the first base 1153 and the first adhesive layer 1152, and therefore the first line layer 114 can be effectively protected by using the first base 1153 and the first adhesive layer 1152, in other words, the first line layer 114 can be prevented from being scratched or damaged when the user uses the electronic device 100.

A method for manufacturing the rear cover 11 is described below in detail.

First, the first base 1153 is formed on a substrate. The substrate may be but is not limited to PET or PI. Specifically, a surface of the substrate is coated with a polymer colloid, and the first base 1153 is formed after the polymer colloid is cured.

Then, the plurality of first grooves 112 arranged at intervals in the first direction and the plurality of second grooves 113 arranged at intervals in the second direction are formed on a surface that is of the first base 1153 and that is away from the substrate. In an implementation, the plurality of first grooves 112 arranged at intervals in the first direction and the plurality of second grooves 113 arranged at intervals in the second direction are formed on the surface that is of the first base 1153 and that is away from the substrate by using an imprinting process.

Then, the first groove 112 and the second groove 113 are filled with a conductive material. For example, the conductive material is silver paste. The first line layer 114 is formed after the silver paste is cured. In another implementation, the conductive material may be a precious metal material such as copper, gold, aluminum, or platinum, or a conductive oxide.

Then, the first adhesive layer 1152 is formed on the surface that is of the first base 1153 and that is away from the substrate. The first adhesive layer 1152 covers the first line layer 114 in the first groove 112 and the second groove 113. The first adhesive layer 1152 may be but is not limited to optical clear adhesive.

Finally, a surface that is of the first adhesive layer 1152 and that is away from the first base 1153 is bonded to the baseboard 1151, and the substrate is torn off. In this case, the rear cover 11 that includes the first line layer 114 is manufactured.

In this implementation, according to the method, a part of the rear cover 11 may form the first line layer 114, so that the first line layer 114 is used as the radiator 42 of the antenna module 40. It may be understood that for the rear cover 11 formed by using the method, it may be implemented that the first line layer 114 is formed and surrounded by the first base 1153 and the first adhesive layer 1152, to ensure that the first line layer 114 is not easily damaged. In addition, the method for manufacturing the rear cover 11 is simple and easy to implement.

In this implementation, for a manner of disposing the first line layer 114, refer to the disposing manner, in the first implementation, in which the first line layer 114 includes the first sublayer 1143 and the second sublayer 1144 that are stacked or the first line layer 114 includes the first sublayer 1143, the second sublayer 1144, and the third sublayer 1145 that are sequentially stacked. Details are not described.

In addition, for a feeding manner of the first line layer 114 and the radio frequency transceiver circuit 41, refer to the first implementation. Details are not described herein again.

In another implementation, a first ink layer 107 is disposed on the first surface 1111 of the baseboard 1151. A second ink layer 117 may be further disposed on a surface that is of the first line layer 114 and that is away from the first ink layer 107. It may be understood that for manners of disposing the first ink layer 107 and the second ink layer 117 in this implementation, refer to the manners of disposing the first ink layer 107 and the second ink layer 117 in the first implementation.

Figure 19:
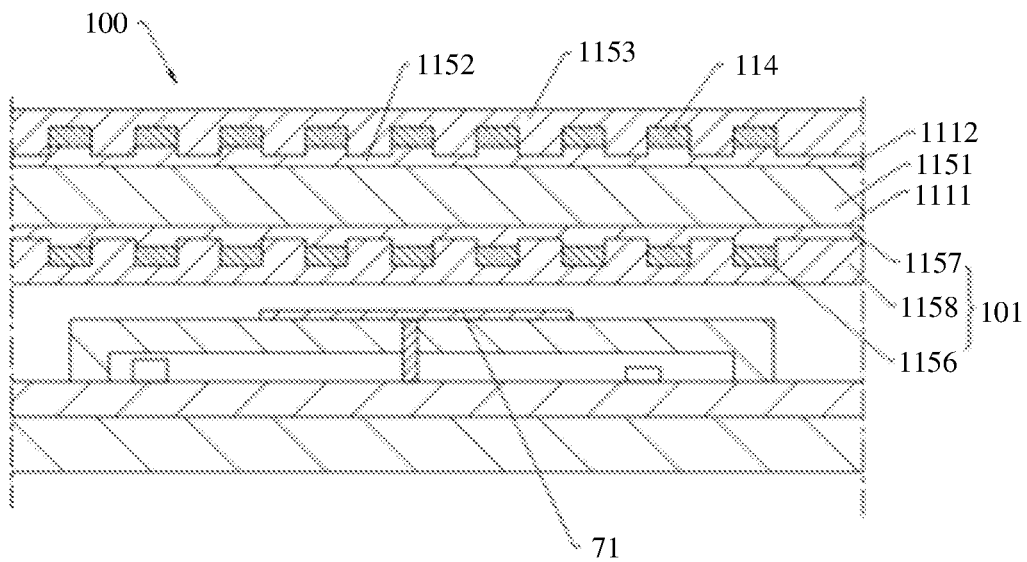
FIG. 19 is a schematic cross-sectional diagram of still another implementation of the electronic device shown in FIG. 1 along a line B-B.

FIG. 19 is a schematic cross-sectional diagram of still another implementation of the electronic device shown in FIG. 1 along a line B-B. The rear cover 11 further includes a third antenna layer 101. The third antenna layer 101 is disposed on a first surface 1111 of a baseboard 1151. The third antenna layer 101 includes a second base 1158, a third line layer 1156, and a second adhesive layer 1157. The third line layer 1156 is disposed between the second base 1158 and the second adhesive layer 1157. A plurality of third grooves and a plurality of fourth grooves are disposed at the second base 1158. The plurality of third grooves are arranged at intervals in the first direction. The plurality of fourth grooves are arranged at intervals in the second direction. The plurality of third grooves and the plurality of fourth grooves are disposed intersecting each other. For a width of the third groove and a size and a forming manner of the fourth groove, refer to the sizes and the forming manners of the first groove and the second groove. Details are not described herein again. In addition, a third conducting wire is disposed in the third groove, and a fourth conducting wire is disposed in the fourth groove. The third conducting wire and the fourth conducting wire form the third line layer 1156. The third line layer forms the radiator of the antenna. For sizes and forming manners of the third conducting wire and the fourth conducting wire, refer to the sizes and the forming manners of the first conducting wire and the second conducting wire. Details are not described herein again.

It may be understood that the third line layer 1156 is coupled to both the first line layer 114 and a second line layer 71. In this case, when a radio frequency signal is transmitted to the second line layer 71, the radio frequency signal can be coupled and fed to the third line layer 1156 by using the second line layer 71. In this case, the radio frequency signal is then coupled and fed to the first line layer 114 by using the third line layer 1156. The third line layer 1156, the first line layer 114, and second line layer 71 radiate an antenna signal to the outside of the electronic device 100. The second line layer 71 receives an antenna signal, and converts the antenna signal into a radio frequency signal. A direction of transferring the radio frequency signal is opposite to the foregoing direction.

In this implementation, the third line layer 1156 is disposed on the first surface 111 of the rear cover 11, to increase a quantity of radiators, so that the electronic device 100 can cover a wider communication range.

In an implementation, a pattern layer may be built into the rear cover body 111. For a manner of disposing the pattern layer in this implementation, refer to the manner of disposing the pattern layer 118 in the first implementation. Details are not described herein again.

In another implementation, a first ink layer 107 is disposed on the first surface 1111 of the baseboard 1151. A second ink layer 117 may be further disposed on a surface that is of the first line layer 114 and that is away from the first ink layer 107. In this case, the second base 1158 and the second adhesive layer 1157 may be disposed on a surface that is of the first ink layer 107 and that is away from the baseboard 1151.

The first embodiment of disposing the radiator 42 is described above by using related drawings. It may be clearly learned from the first embodiment that when a part of the housing 10 forms the radiator 42, the housing 10 functions as a "multi-purpose object". A second embodiment that is of the manner of disposing the radiator 42 and in which a part of a protective cover of the optical module forms the radiator 42 is described below in detail with reference to related drawings. In this case, the protective cover of the optical module also functions as a "multi-purpose object".

Figure 20:
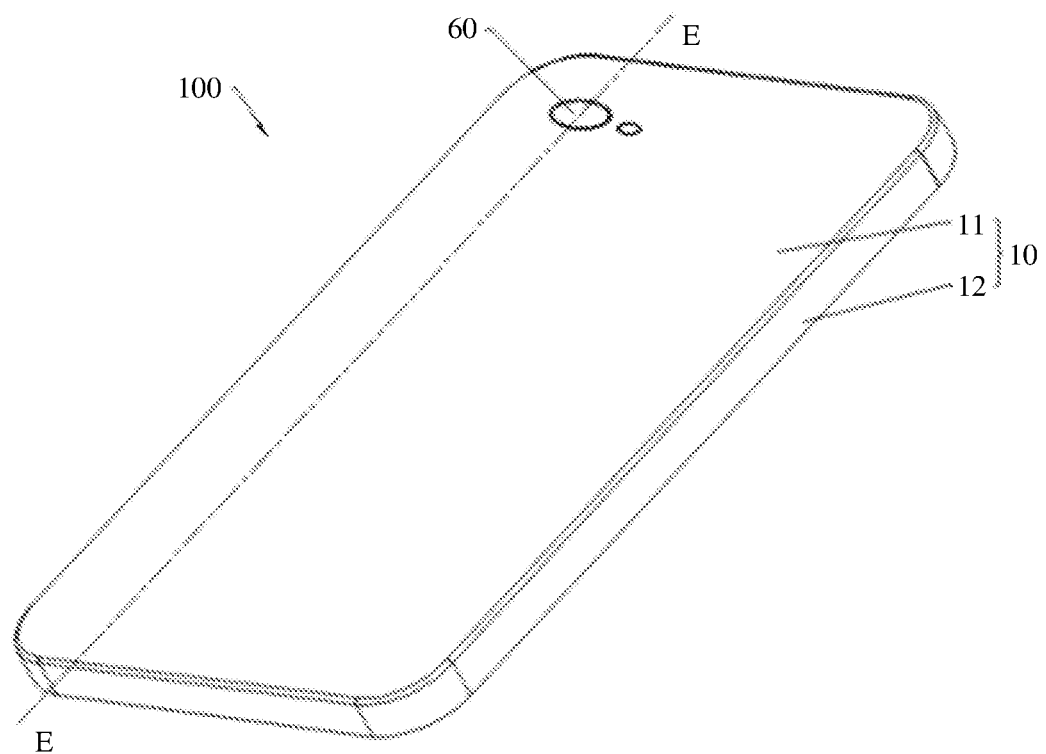
FIG. 20 is a schematic diagram of a structure of still another implementation of an electronic device according to an embodiment of this application.

Technical content, in the second embodiment, that is the same as that in the first embodiment is not described. FIG. 20 is a schematic diagram of a structure of still another implementation of the electronic device according to an embodiment of this application, and FIG. 21 is an exploded schematic diagram of the electronic device shown in FIG. 20.

The electronic device 100 further includes the optical module. The optical module may be a camera module, a structured light module, a fingerprint module, or the like. In this embodiment, an example in which the optical module is a camera module is used. Specifically, the camera module 50 is fixedly connected to the accommodation space 13. A via hole 14 is disposed on the housing 10. The via hole 14 connects the accommodation space 13 to the outside of the housing 10. It is shown in FIG. 21 that the via hole 14 is located on the rear cover 11. In addition, the electronic device 100 further includes the first cover 60. The first cover 60 is a protective cover of the camera module 50. The first cover 60 is fixedly connected to the housing 10, and covers the via hole 14. The first cover 60 is made of a transparent material. For example, the first cover 60 is made of glass or organic glass. In this case, the camera module 50 collects ambient light that passes through the first cover 60. In addition, the first cover 60 may be further used to protect the camera module 50, that is, prevent the camera module 50 from colliding with an external object as the camera module 50 is exposed outside the electronic device 100.

In this embodiment, a part of the first cover 60 forms the radiator 42. In this case, the first cover 60 has performance of a transceiver antenna.

Figure 21:
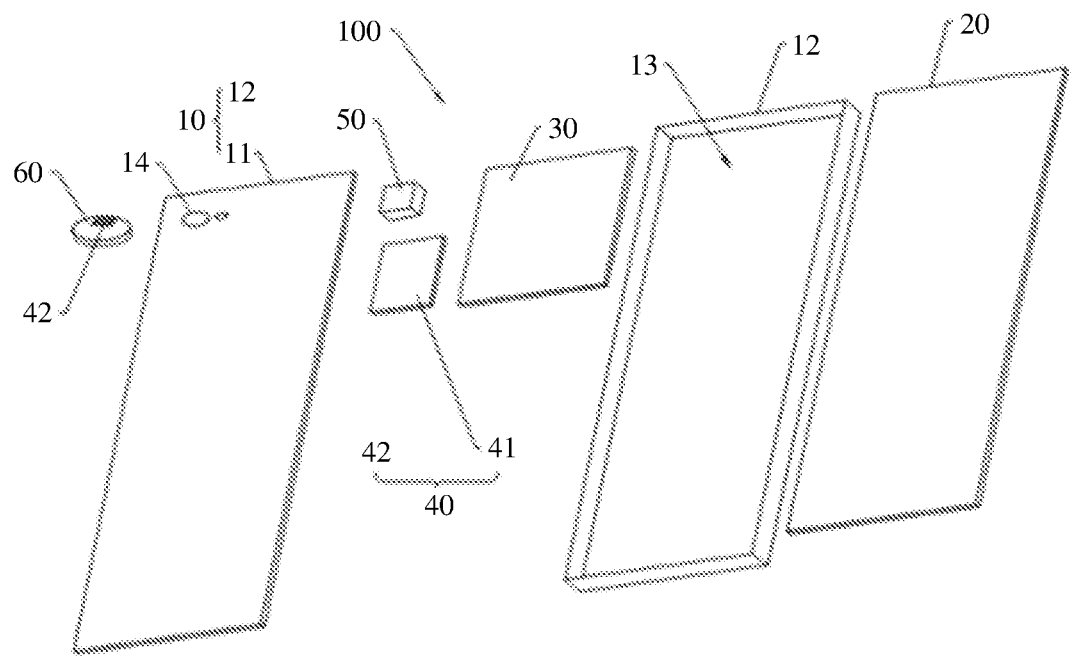
FIG. 21 is an exploded schematic diagram of the electronic device shown in FIG. 20.

It may be understood that a quantity of camera modules 50 is not limited to one camera module shown in FIG. 20 and FIG. 21. There may be two or more camera modules 50. When there are a plurality of camera modules 50, the plurality of camera modules 50 may be arranged in a width direction of the electronic device 100, or may be arranged in a length direction of the electronic device 100. In addition, the camera module 50 may be but is not limited to a wide-angle camera module, a telephoto camera module, a color camera module, or a black-and-white camera module.

In addition, the camera module 50 is electrically connected to the central processing unit on the circuit board 30. In this case, the central processing unit can control the camera module 50 to capture an image. Specifically, when the user enters a photographing instruction, the central processing unit receives the photographing instruction, and the central processing unit controls, based on the photographing instruction, the camera module 50 to perform photographing.

Figure 22:
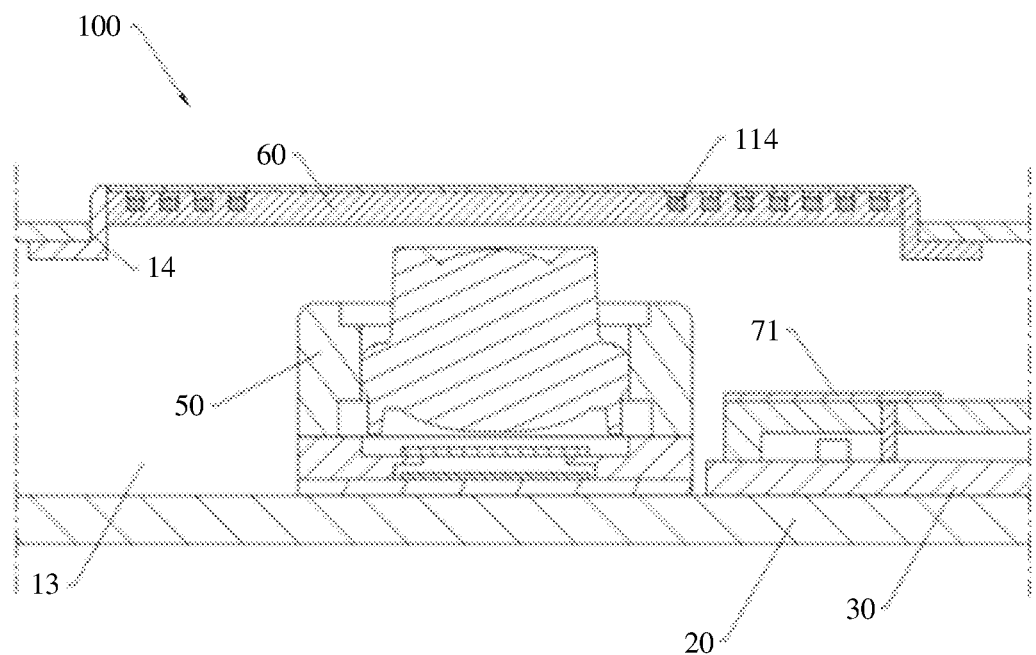
FIG. 22 is a schematic cross-sectional diagram of the electronic device in FIG. 20 along a line E-E.

Referring to FIG. 22, with reference to FIG. 21, FIG. 22 is a schematic cross-sectional diagram of the electronic device in FIG. 20 along a line E-E. A first line layer 114 is disposed on the first cover 60. The first line layer 114 forms the radiator 42 of the antenna. Specifically, for a manner of disposing the first line layer 114, refer to the first implementation and the second implementation in the first embodiment. Details are not described herein again. In addition, for a feeding manner of the first line layer 114 and the radio frequency transceiver circuit 41, refer to the first embodiment. Details are not described herein again.

It may be understood that when the first line layer 114 is disposed on the first cover 60, the first line layer 114 may be configured to send and receive an antenna signal. Specifically, a radio frequency signal can be fed to the first line layer 114 by using a second line layer 71, and the first line layer 114 radiates an antenna signal to the outside of the electronic device 100. Alternatively, the first line layer 114 can receive an antenna signal from the outside of the electronic device 100, and convert the antenna signal into a radio frequency signal. In this case, a quantity of antennas in the electronic device 100 is significantly increased, and therefore the electronic device 100 can cover a wider communication range. In addition, the radiator 42 does not need to occupy the accommodation space 13. In this case, the radiator 42 does not affect or interfere with the electronic component in the accommodation space 13. Furthermore, the first cover 60 can allow ambient light to enter the accommodation space 13 and has a function of protecting the camera module 50, and the first cover 60 further has a function of sending and receiving an antenna signal. Therefore, the first cover 60 functions as a "multi-purpose object".

In addition, the first line layer 114 imposes relatively weak interference and small impact on ambient light. In other words, when the user views the first cover 60, the first line layer 114 is visually substantially transparent to the user. In addition, the first line layer 114 imposes relatively weak interference and small impact on the ambient light, and therefore the first line layer 114 imposes relatively small impact on collection of ambient light by the camera module 50, in other words, the first line layer 114 imposes relatively small impact on imaging of the camera module 50.

Figure 23:
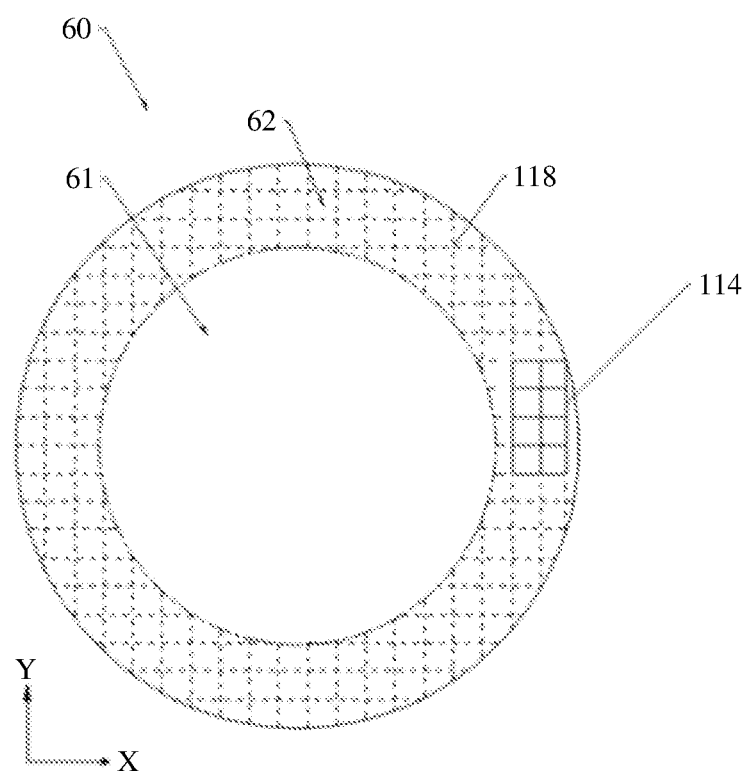
FIG. 23 is a schematic diagram of a structure of a first cover of the electronic device shown in FIG. 20.

Referring to FIG. 22 and FIG. 23, FIG. 23 is a schematic diagram of a structure of the first cover of the electronic device shown in FIG. 20. The first cover 60 includes an imaging region 61 and a non-imaging region 62 connected to the imaging region 61. The first line layer 114 is located in the non-imaging region 62. It may be understood that when ambient light passes through the imaging region 61, the ambient light may be received by the camera module 50. When ambient light passes through the non-imaging region 62, the ambient light cannot be received by the camera module 50. In this case, the first line layer 114 can effectively use space in which the non-imaging region 62 of the first cover 60 is located, to improve utilization of the first cover 60. In addition, the first line layer 114 is completely separated from the imaging region 61. In this case, the first line layer 114 hardly affects collection of ambient light by the camera module 50.

In addition, referring to FIG. 23 again, the pattern layer 118 is located in the non-imaging region 62. In this case, the pattern layer 118 can effectively use the space in which the non-imaging region 62 of the first cover 60 is located, to improve utilization of the first cover 60. In addition, the pattern layer 118 is completely separated from the imaging region 61. In this case, the pattern layer 118 hardly affects collection of ambient light by the camera module 50.

Furthermore, the pattern layer 118 is disposed in the non-imaging region 62, so that the first line layer 114 is hidden in the pattern layer 118, to implement relatively high appearance consistency for the non-imaging region 62 of the first cover 60. In other words, when the user views the first cover 60, the user views a substantially same situation at all positions in the non-imaging region 62 of the first cover 60. In other words, the first line layer 114 imposes relatively small impact on an appearance of the non-imaging region 62.

The second embodiment of disposing the radiator 42 is described above by using related drawings. It may be clearly learned from the second embodiment that when a part of the first cover 60 forms the radiator 42, the first cover 60 functions as a "multi-purpose object". A third embodiment that is of the manner of disposing the radiator 42 and in which a part of the second cover forms the radiator 42 is described below in detail with reference to related drawings. In this case, the second cover also functions as a "multi-purpose object".

Figure 24:
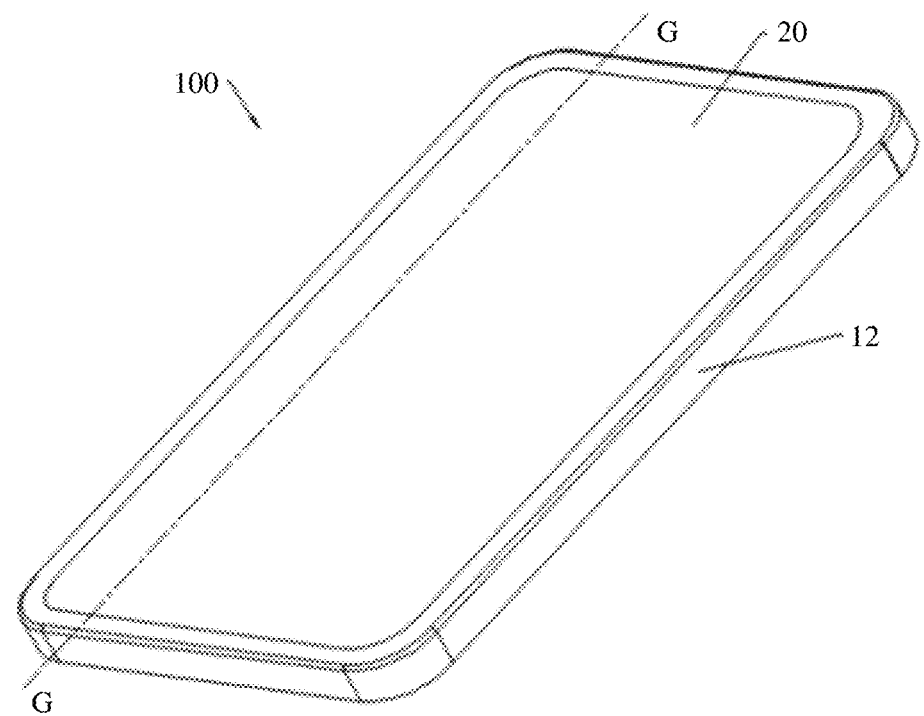
FIG. 24 is a schematic diagram of a structure of still another implementation of an electronic device according to an embodiment of this application.
Figure 25:
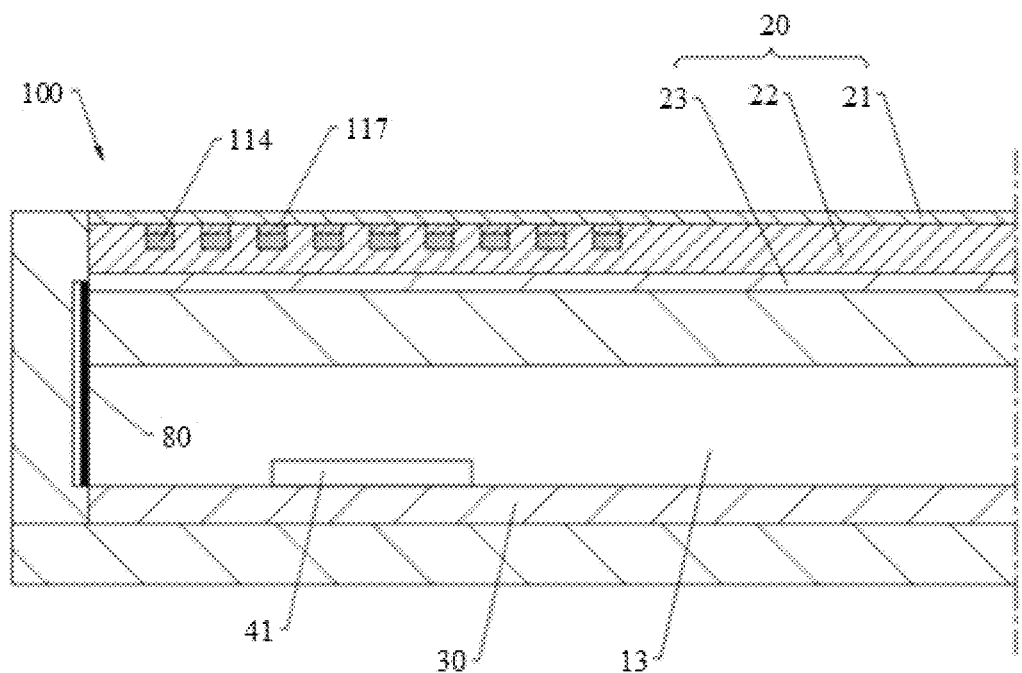
FIG. 25 is a schematic cross-sectional diagram of an implementation of the electronic device in FIG. 24 along a line G-G.

Technical content, in the third embodiment, that is the same as that in the first embodiment and the second embodiment is not described. FIG. 24 is a schematic diagram of a structure of still another implementation of the electronic device according to an embodiment of this application, and FIG. 25 is a schematic cross-sectional diagram of an implementation of the electronic device in FIG. 24 along a line G-G. The screen 20 includes the second cover 21 and a display 22. The second cover 21 is a protective cover of the screen 20. The second cover 21 is stacked on the display 22, and the second cover 21 is located on a side that is of the display 22 and that is away from the accommodation space 13. The second cover 21 is used to protect the display 22. In addition, the second cover 21 may be made of a transparent material, for example, glass or organic glass. In this case, the user can view, by using the second cover 21, an image displayed on the display 22. The display 22 may be but is not limited to a liquid crystal display (liquid crystal display, LCD). For example, the display 22 may alternatively be an organic light-emitting diode (organic light-emitting diode, OLED) display.

In addition, a first line layer 114 is disposed on the second cover 21. The first line layer 114 forms the radiator 42 of the antenna. A manner of disposing the first line layer 114 is the same as the manner of disposing the first line layer 114 in the first embodiment. Specifically, for the manner of disposing the first line layer 114, refer to the first implementation and the second implementation in the first embodiment. Details are not described herein again.

It may be understood that when the first line layer 114 is disposed on the second cover 21, the first line layer 114 may be configured to send and receive an antenna signal. In this case, a quantity of antennas in the electronic device 100 is significantly increased, and therefore the electronic device 100 can cover a wider communication range. In addition, the radiator 42 does not need to occupy the accommodation space 13. In this case, the radiator 42 does not affect or interfere with the electronic component in the accommodation space 13. Furthermore, the second cover 21 can allow display light emitted by the display 22 to pass through the electronic device 100 and has a function of protecting the display 22, and the second cover 21 further has a function of sending and receiving an antenna signal. Therefore, the second cover 21 functions as a "multi-purpose object".

In addition, the first line layer 114 imposes relatively weak interference and small impact on light, and therefore when the display light emitted by the display 22 passes through the rear cover 11, the first line layer 114 imposes relatively weak interference and small impact on the display light. In other words, when the user views, by using the second cover 21, an image displayed on the display 22, it is difficult for the user to recognize the first line layer 114, in other words, it is difficult for the user to distinguish the first line layer 114 from the second cover 21.

It may be understood that, that a part of the second cover 21 forms the radiator 42 is described above in detail. A feeding manner of the radio frequency transceiver circuit 41 and the radiator 42 is described below in detail with reference to related drawings.

Referring to FIG. 25 again, the screen 20 further includes a conductive film 23. The conductive film 23 is disposed between the display 22 and the second cover 21. The conductive film 23 is electrically connected to the radio frequency transceiver circuit 41. The conductive film 23 is coupled to the first line layer 114. In this case, the radio frequency transceiver circuit 41 transmits a radio frequency signal, the radio frequency signal is transmitted to the conductive film 23, and is fed to the first line layer 114 by using the conductive film 23, and the first line layer 114 radiates an antenna signal based on the radio frequency signal. In addition, when receiving an antenna signal from the outside of the electronic device 100, the first line layer 114 converts the antenna signal into a radio frequency signal. The radio frequency signal is fed to the conductive film 23 by using the first line layer 114, and is transmitted to the radio frequency transceiver circuit 41 by using the conductive film 23.

Figure 26:
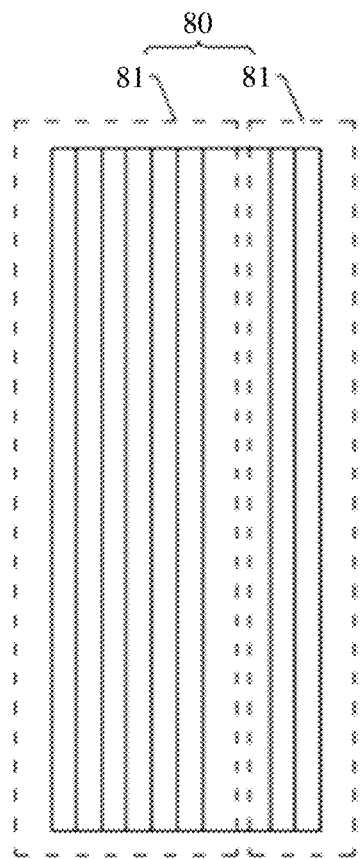
FIG. 26 is a schematic diagram of a structure of a signal trace of the electronic device shown in FIG. 24.

Referring to FIG. 25 and FIG. 26, FIG. 26 is a schematic diagram of a structure of a signal trace of the electronic device shown in FIG. 24. The electronic device 100 includes a signal trace 80. The signal trace 80 includes a first part 81 and a second part 82 connected to the first part 81. One end of the first part 81 is electrically connected to the display 22, and the other end is electrically connected to the central processing unit by using the circuit board 30. In this case, when the user needs the display 22 to display an image, the user enters a display instruction, the display instruction is transmitted to the central processing unit, and the central processing unit controls, based on the display instruction, the display 22 to display an image. One end of the second part 82 of the signal trace 80 is electrically connected to the conductive film 23, and the other end is electrically connected to the radio frequency transceiver circuit 41 by using the circuit board 30. In this case, a radio frequency signal transmitted by the radio frequency transceiver circuit 41 can be transmitted to the conductive film 23 by using the second part 82. In addition, a radio frequency signal fed to the conductive film 23 by using the first line layer 114 can also be transmitted to the radio frequency transceiver circuit 41 by using the second part 82.

It may be understood that a trace for transmitting the display instruction and a trace for transmitting the radio frequency signal are disposed as the signal trace 80, to avoid a case in which the electronic device 100 has a complex internal structure as the trace for transmitting the display instruction and the trace for transmitting the radio frequency signal are distributed in the accommodation space 13 in a disorderly manner, in other words, to ensure that the electronic device 100 can have an orderly and simplified internal structure.

Figure 27:
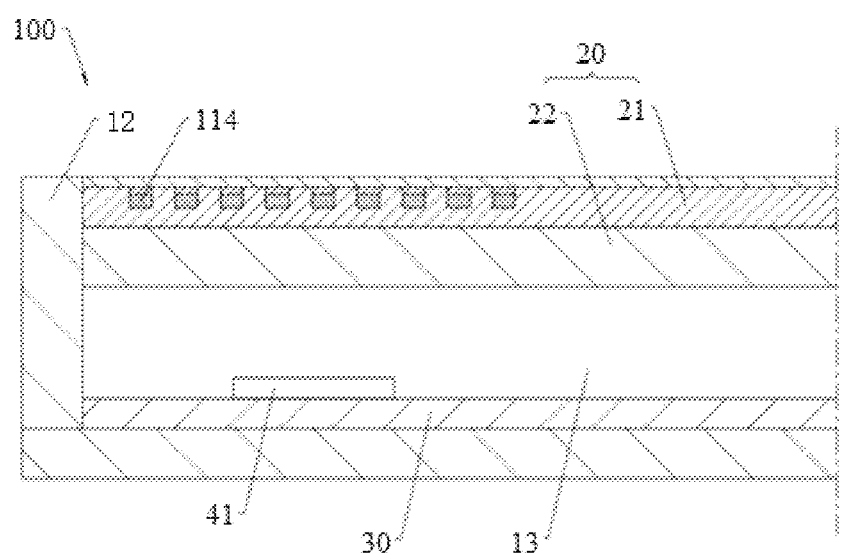
FIG. 27 is a schematic cross-sectional diagram of another implementation of the electronic device in FIG. 24 along a line G-G.

FIG. 27 is a schematic cross-sectional diagram of another implementation of the electronic device in FIG. 24 along a line G-G. The frame 12 is a metal material. A part of the frame 12 forms a second radiator. The second radiator is electrically connected to the radio frequency transceiver circuit 41. The second radiator is coupled to the first line layer 114. That is, when the radio frequency transceiver circuit 41 transmits a radio frequency signal, the radio frequency signal is transmitted to the second radiator, the second radiator couples and feeds the radio frequency signal to the first line layer 141, and the first line layer 141 radiates an antenna signal. In addition, when the first line layer 141 receives an antenna signal, and converts the antenna signal into a radio frequency signal, the radio frequency signal is fed to the second radiator by using the first line layer 141.

In another implementation, the feeding manner of the radio frequency transceiver circuit 41 and the first line layer 141 may be the feeding manner of the radio frequency transceiver circuit 41 and the first line layer 141 in the first embodiment.

Figure 28:
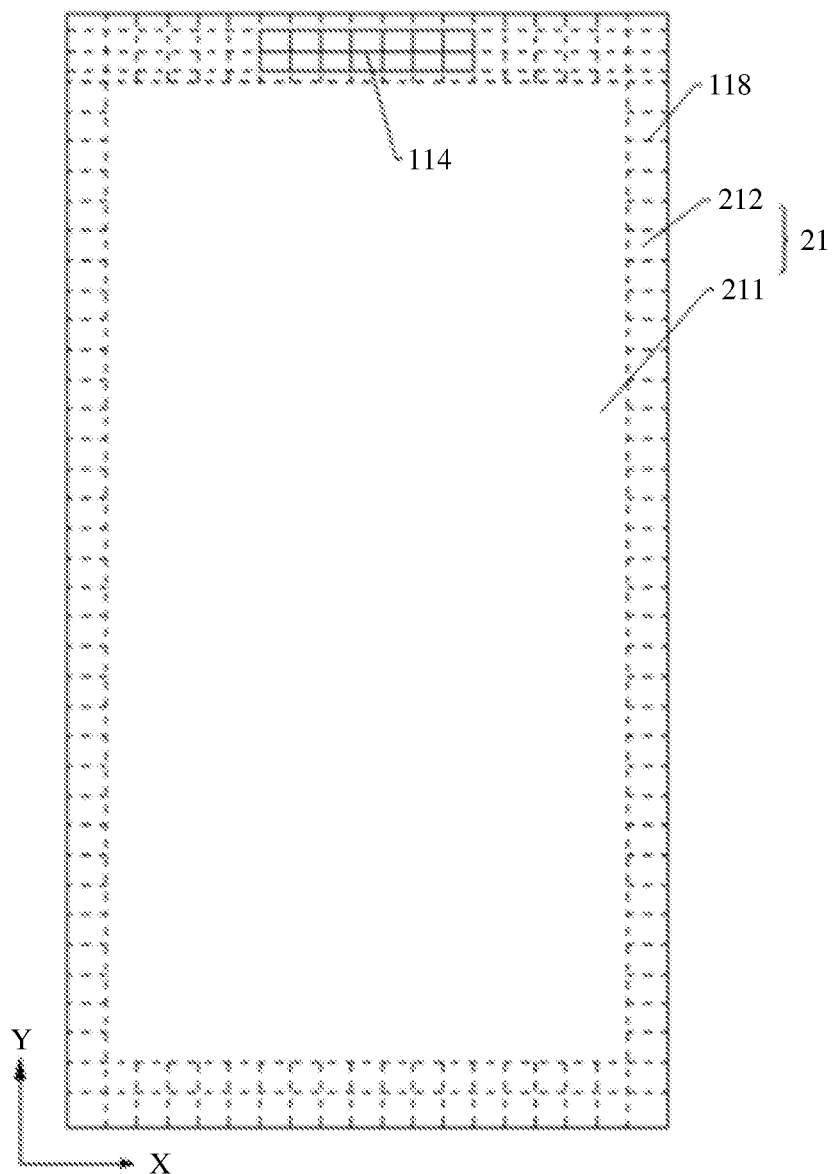
FIG. 28 is a schematic cross-sectional diagram of another manner of a second cover according to an embodiment of this application.

FIG. 28 is a schematic cross-sectional diagram of another manner of the second cover according to an embodiment of this application. The second cover 21 includes a display region 211 and a non-display region 212 connected to the display region 211. The first line layer 114 is located in the non-display region 212. It may be understood that the display region 211 is a region, on the second cover 21, that can allow display light to pass through, and the non-display region 212 is a region, on the second cover 21, that cannot allow the display light to pass through. In this case, when the first line layer 114 is located in the non-display region 212, the first line layer 114 can effectively use space in which the non-display region 212 of the second cover 21 is located, to improve utilization of the second cover 21. In addition, the first line layer 114 can be completely separated from the display region 211, to reduce impact and interference on the display light emitted by the display 22.

Referring to FIG. 28 again, the pattern layer 118 is located in the non-display region 212. In this case, the pattern layer 118 can effectively use the space in which the non-display region 212 of the second cover 21 is located, to improve utilization of the second cover 21. In addition, the pattern layer 118 is completely separated from the display region 211. In this case, the pattern layer 118 hardly affects the display light emitted by the display 22.

Furthermore, the pattern layer 118 is disposed in the non-display region 212, so that the first line layer 114 is hidden in the pattern layer 118, to implement relatively high appearance consistency for the non-display region 212 of the second cover 21. In other words, when the user views the second cover 21, the user views a substantially same situation at all positions in the non-display region 212 of the second cover 21. In other words, the first line layer 114 imposes relatively small impact on an appearance of the non-display region 212.

In this embodiment, a part of the second cover 21 forms the radiator 42, so that an antenna signal is sent and received by using the second cover 21. In this case, the second cover 21 can be used to protect the display 22, and can send and receive an antenna signal. Therefore, the second cover 21 functions as a "multi-purpose object". In addition, the radiator 42 imposes relatively small impact and weak interference on ambient light, and therefore the radiator 42 imposes relatively small impact and weak interference on the light emitted by the display 22.

Figure 29:
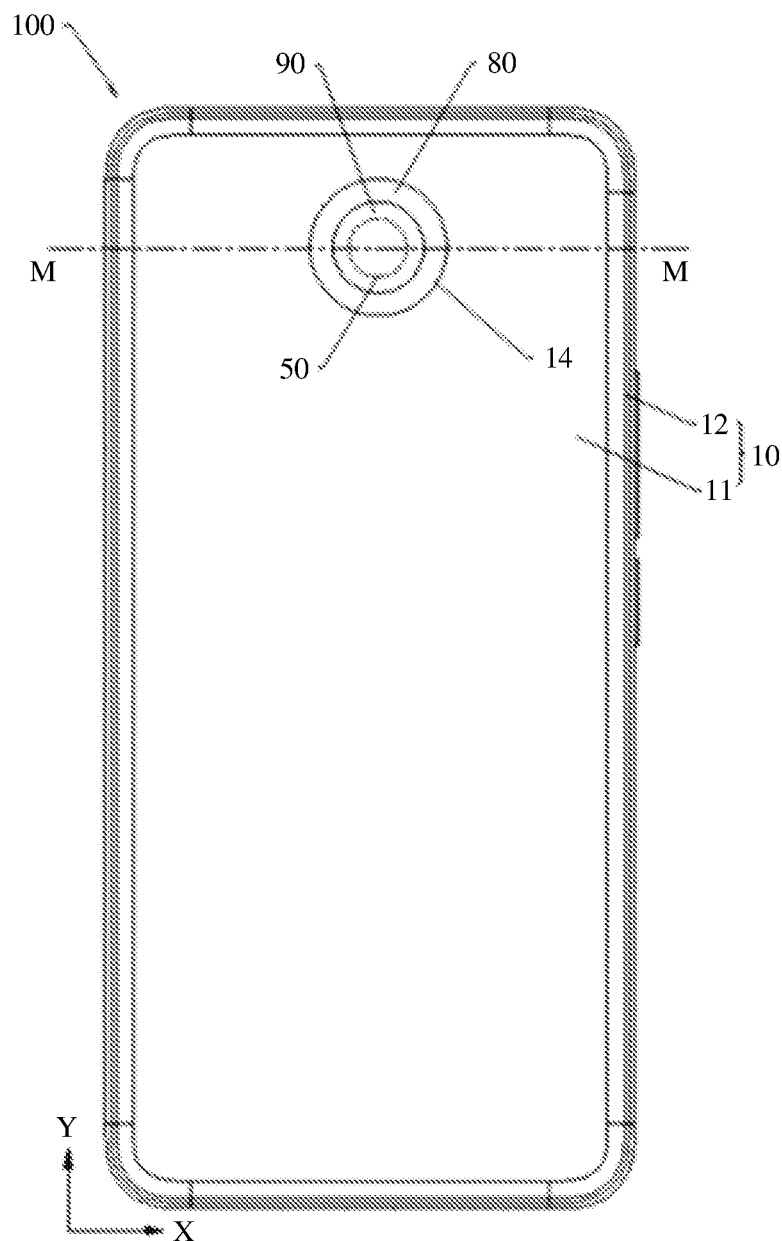
FIG. 29 is a schematic diagram of a structure of still another implementation of an electronic device according to an embodiment of this application.
Figure 30:
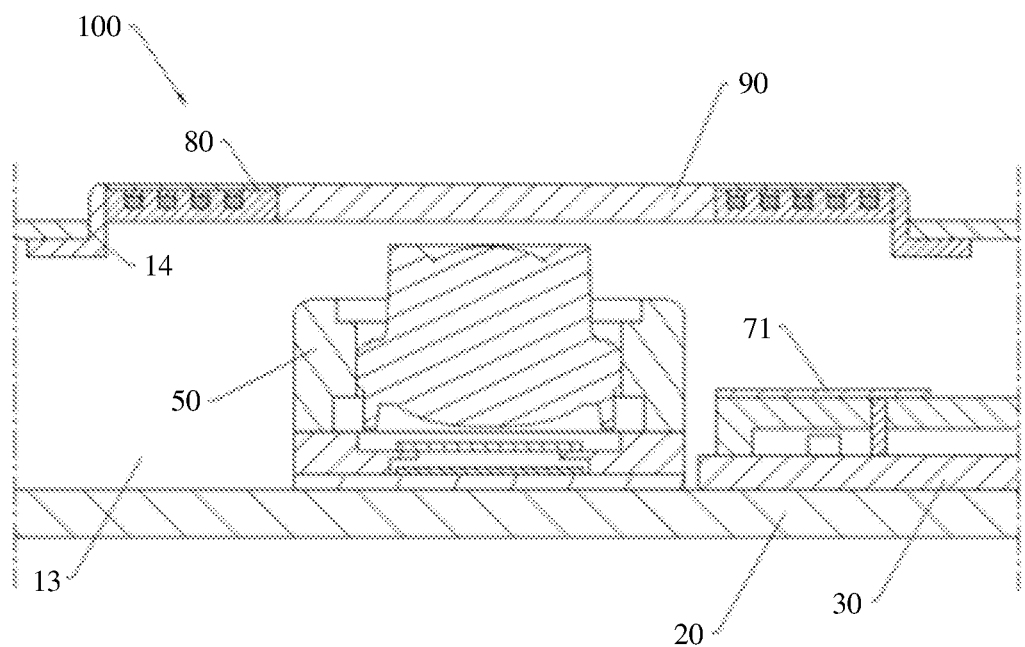
FIG. 30 is a schematic cross-sectional diagram of the electronic device in FIG. 29 along a line M-M.

Technical content, in the fourth embodiment, that is the same as that in the first embodiment is not described. FIG. 29 is a schematic diagram of a structure of still another implementation of the electronic device according to an embodiment of this application, and FIG. 30 is a schematic cross-sectional diagram of the electronic device in FIG. 29 along a line M-M.

The electronic device 100 further includes an optical module and a protective cover 90. The optical module may be a camera module, a structured light module, a fingerprint module, or the like. In this embodiment, an example in which the optical module is a camera module is used. Specifically, the camera module 50 is fixedly connected to the accommodation space 13. A via hole 14 is disposed on the housing 10. The via hole 14 connects the accommodation space 13 to the outside of the housing 10. It is shown in FIG. 30 that the via hole 14 is located on the rear cover 11. In addition, the electronic device 100 further includes a third cover 80. The third cover 80 is a decorative part of the camera module 50. The third cover 80 is disposed around the protective cover 90, and is connected to a peripheral side surface of the protective cover 90. The third cover 80 is fixedly connected to the housing 10. The third cover 80 and the protective cover 90 jointly cover the via hole 14. The camera module 50 collects ambient light that passes through the protective cover 90. In addition, the protective cover 90 may be further used to protect the camera module 50, that is, prevent the camera module 50 from colliding with an external object as the camera module 50 is exposed outside the electronic device 100.

It may be understood that when the third cover 80 is used as the decorative part of the optical module, the third cover 80 may be used to send and receive an antenna signal. In this case, the third cover 80 functions as a "multi-purpose object". In addition, the first line layer 114 of the third cover 80 does not need to occupy the accommodation space 13. In this case, the first line layer 114 does not affect or interfere with the electronic component in the accommodation space 13.

In this application, three manners of disposing the radiator 42 are described in detail with reference to related drawings. Details are as follows:

First embodiment: The radiator 42 is a part of the housing 10.

Second embodiment: The radiator 42 is a part of the protective cover of the optical module.

Third embodiment: The radiator 42 is a part of the protective cover of the screen 20.

Fourth embodiment: The radiator 42 is a part of the decorative part of the optical module.

It may be understood that when the radiator 42 is a part of the housing 10, the radiator body 42 is a part of the protective cover of the optical module, the radiator 42 is a part of the protective cover of the screen 20, or the radiator 42 is a part of the decorative part of the optical module, the quantity of antennas in the electronic device 100 is significantly increased, and therefore the electronic device 100 can cover a wider communication range. In addition, the radiator 42 does not need to occupy the accommodation space 13. In this case, the radiator 42 does not affect or interfere with the electronic component in the accommodation space 13. Furthermore, the housing 10, the protective cover of the optical module, the protective cover of the screen 20, or the decorative part of the optical module has the function of sending and receiving an antenna signal, and therefore the housing 10, the protective cover of the optical module, the protective cover of the screen 20, or the decorative part of the optical module functions as a "multi-purpose object".

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A cover, applied to an electronic device, wherein the cover comprises:
    a cover body, wherein a material of the cover body is an insulating material; and
    a first line layer, wherein a material of the first line layer is a conductive material, the first line layer is completely built into the cover body, a form of the first line layer implements a radiator, and the first line layer is coupled to a radio frequency transceiver circuit of the electronic device; and
    wherein the first line layer comprises a plurality of first conducting wires and a plurality of second conducting wires, the plurality of first conducting wires are arranged at intervals in a first direction, the plurality of second conducting wires are arranged at intervals in a second direction, the plurality of first conducting wires and the plurality of second conducting wires intersect each other, the first direction is different from the second direction, a width of each of first conducting wire of the plurality of first conducting wires, and of each second conducting wire of the plurality of second conducting wires, is less than or equal to 50 micrometers, a distance between two adjacent first conducting wires of the plurality of first conducting wires is greater than or equal to 50 micrometers, and a distance between two adjacent second conducting wires of the plurality of second conducting wires is greater than or equal to 50 micrometers;
    wherein the cover body comprises a baseboard and a first protective layer, a plurality of first grooves and a plurality of second grooves extend in a same side of the baseboard, the plurality of first grooves are arranged at intervals in the first direction, the plurality of second grooves are arranged at intervals in the second direction, the plurality of first grooves and the plurality of second grooves intersect each other, the plurality of first conducting wires are disposed in the plurality of first grooves in a one-to-one correspondence, the plurality of second conducting wires are disposed in the plurality of second grooves in a one-to-one correspondence, the first protective layer is fastened on the baseboard, the first protective layer is on a same side of the baseboard as the plurality of first grooves, and the first protective layer covers the plurality of first conducting wires and the plurality of second conducting wires;

wherein the cover further comprises:
  a first ink layer disposed on a surface of the cover body, the first ink layer being located on a side of the first line layer; and
  a second ink layer completely built into the cover body, the second ink layer being stacked on a surface of the first line layer that faces away from the first ink layer, and a color of the second ink layer and a color of the first ink layer belonging to a same color system.

2. The cover according to claim 1, wherein a thickness of each first conducting wire of the plurality of first conducting wires, and of each second conducting wire of the plurality of second conducting wires, is less than or equal to 50 micrometers.

3. The cover according to claim 1, further comprising:
a pattern layer, wherein the pattern layer is completely built into the cover body and is disposed at a same layer as the first line layer, the pattern layer comprises a plurality of first traces and a plurality of second traces, the plurality of first traces are arranged at intervals in the first direction, the plurality of second traces are arranged at intervals in the second direction, some of the plurality of first traces are arranged in alignment with the plurality of first conducting wires in a one-to-one correspondence, and some of the plurality of second traces are arranged in alignment with the plurality of second conducting wires in a one-to-one correspondence; and wherein:
  a material of each first trace of the plurality of first traces and each second trace of the plurality of second traces is the conductive material, each first trace of the plurality of first traces comprises a plurality of first trace segments disposed at intervals, and each second trace of the plurality of second traces comprises a plurality of second trace segments disposed at intervals; or
  a material of each first trace of the plurality of first traces and each second trace of the plurality of second traces is the insulating material.

4. The cover according to claim 3, wherein the material of each first trace of the plurality of first traces and each second trace of the plurality of second traces is the conductive material, and a spacing distance between every two first trace segments of the plurality of first trace segments ranges from 1 micrometer to 20 micrometers.

5. The cover according to claim 1, further comprising:
a second line layer, wherein the second line layer is fastened on a side of the baseboard that faces away from the first protective layer, a material of the second line layer is the conductive material, a form of the second line layer implements a radiator, and the second line layer is coupled to the first line layer and the radio frequency transceiver circuit of the electronic device.

6. The cover according to claim 5, wherein the cover body further comprises a second protective layer, and the second protective layer is disposed on a side of the baseboard that faces away from the first protective layer, and the second protective layer covers the second line layer.

7. The cover according to claim 1, wherein the first line layer comprises a first sublayer and a second sublayer that are stacked, and a resistivity of the second sublayer is less than resistivity of the first sublayer.

8. The cover according to claim 7, wherein the first line layer further comprises a third sublayer, the third sublayer is disposed on a surface of the second sublayer that faces away from the first sublayer, and an oxidation resistance of the third sublayer is higher than an oxidation resistance of the second sublayer.

9. The cover according to claim 1, wherein the cover is a protective cover of a display, a rear cover, a protective cover of an optical module, or a decorative part of an optical module of the electronic device.

10. An electronic device, comprising:
a radio frequency transceiver circuit; and
a cover, comprising:
  a cover body, wherein a material of the cover body is an insulating material; and
  a first line layer, wherein a material of the first line layer is a conductive material, the first line layer is completely built into the cover body, a form of the first line layer implements a radiator, and the first line layer is coupled to the radio frequency transceiver circuit; and
wherein the first line layer comprises a plurality of first conducting wires and a plurality of second conducting wires, the plurality of first conducting wires are arranged at intervals in a first direction, the plurality of second conducting wires are arranged at intervals in a second direction, the plurality of first conducting wires and the plurality of second conducting wires intersect each other, the first direction is different from the second direction, a width of each of first conducting wire of the plurality of first conducting wires, and of each second conducting wire of the plurality of second conducting wires, is less than or equal to 50 micrometers, a distance between two adjacent first conducting wires of the plurality of first conducting wires is greater than or equal to 50 micrometers, and a distance between two adjacent second conducting wires of the plurality of second conducting wires is greater than or equal to 50 micrometers; and
wherein the radio frequency transceiver circuit is configured to send and receive a signal by using the first line layer of the cover;
wherein the cover body comprises a baseboard and a first protective layer, a plurality of first grooves and a plurality of second grooves extend in a same side of the baseboard, the plurality of first grooves are arranged at intervals in the first direction, the plurality of second grooves are arranged at intervals in the second direction, the plurality of first grooves and the plurality of second grooves intersect each other, the plurality of first conducting wires are disposed in the plurality of first grooves in a one-to-one correspondence, the plurality of second conducting wires are disposed in the plurality of second grooves in a one-to-one correspondence, the first protective layer is fastened on the baseboard, the first protective layer is on a same side of the baseboard as the plurality of first grooves, and the first protective layer covers the plurality of first conducting wires and the plurality of second conducting wires; and
wherein the cover further comprises:
  a first ink layer disposed on a surface of the cover body, the first ink layer being located on a side of the first line layer; and a second ink layer completely built into the cover body, the second ink layer being stacked on a surface of the first line layer that faces away from the first ink layer, and a color of the second ink layer and a color of the first ink layer belonging to a same color system.

11. The electronic device according to claim 10, wherein the cover is a rear cover of the electronic device, the cover encloses accommodation space, and the radio frequency transceiver circuit is mounted in the accommodation space.

12. The electronic device according to claim 10, further comprising:
   a housing enclosing an accommodation space; and
   an optical module, wherein both the radio frequency transceiver circuit and the optical module are located in the accommodation space, a via hole extends in the housing, the via hole connects the accommodation space to the outside of the electronic device, the cover is mounted on the housing, the cover covers the via hole, and the optical module is configured to collect ambient light or to project light using the cover.

13. The electronic device according to claim 12, wherein the cover comprises an imaging region and a non-imaging region connected to the imaging region, the optical module is configured to collect ambient light or project light using the imaging region, and the first line layer is disposed in the non-imaging region.

14. The electronic device according to claim 12, further comprising:
   a housing; and
   a display mounted on the housing, wherein the display and the housing enclose the accommodation space, the radio frequency transceiver circuit is mounted in the accommodation space, and the cover is fixedly connected to a side of the display that faces away from the accommodation space.

15. The electronic device according to claim 14, wherein the cover comprises a display region and a non-display region connected to the display region, display light emitted by the display is emitted through the display region, and the first line layer is disposed in the non-display region.

* * * * *